United States Patent [19]

Yoshikawa et al.

[11] Patent Number: 5,115,304
[45] Date of Patent: May 19, 1992

[54] COPYING DEVICE WITH DEVELOPING AND TRANSFER DEVICE

[75] Inventors: Sumio Yoshikawa; Yoshiharu Okino; Satoru Sawada, all of Kanagawa, Japan

[73] Assignee: Fuji Photo Film Co., Ltd., Japan

[21] Appl. No.: 367,079

[22] Filed: Jun. 16, 1989

[30] Foreign Application Priority Data

Jun. 16, 1988 [JP] Japan ............... 63-146951
Sep. 12, 1988 [JP] Japan ............... 63-226552

[51] Int. Cl.⁵ ............................... H04N 1/46
[52] U.S. Cl. ............................. 358/75; 250/317.1
[58] Field of Search .............. 250/317, 318, 319; 346/108; 355/308, 309, 239, 326, 327, 328; 358/75, 80; 372/22, 23

[56] References Cited

U.S. PATENT DOCUMENTS

| | | | |
|---|---|---|---|
| 4,469,433 | 9/1984 | Kurata et al. | 250/319 X |
| 4,734,763 | 3/1988 | Urabe et al. | 358/75 X |
| 4,737,822 | 4/1988 | Taniguchi et al. | 250/318 X |
| 4,824,220 | 4/1989 | Yamamoto et al. | 372/22 X |
| 4,845,550 | 7/1989 | Urabe et al. | 358/80 |

FOREIGN PATENT DOCUMENTS 3606427 8/1986 Fed. Rep. of Germany .

Primary Examiner—Tommy P. Chin
Assistant Examiner—Mark R. Powell

[57] ABSTRACT

A copying machine for forming images using either ordinary color photosensitive materials or thermodeveloping photosensitive materials. The copying machine reproduces color images of high quality using a simple and small-scale device without the need for several exposure stages or complicated development processing. The copying machine comprises an image reading device which obtains a trichromatic separated signal by reading an original by photoelectric scanning, an image processing device which effects the desired image processing on the trichromatic separated signal which has been read, an exposure device which trichromatically exposes thermodevelopment and color-sensitive materials by means of the output signal from the image processing device, and a thermodevelopment and transfer device which thermally develops the exposed color-sensitive material and thermally transfers an image to image-receiving materials.

18 Claims, 9 Drawing Sheets

COPYING DEVICE WITH DEVELOPING AND TRANSFER DEVICE

BACKGROUND OF THE INVENTION

This invention relates to a copying device for forming images using either thermodeveloping photosensitive materials or color photosensitive materials.

Conventionally, an electrophotographic method, ink jet method or the like is used to copy a color original.

In the electrophotographic method, a color image which has been fixed by heat or the like generally is reproduced after exposing the colored original using blue, green and red color-separating filters to form electrical latent images on a photosensitive drum that is electrostatically charged in response to the original, then developing the exposed color original using color toners of various colors such as yellow, magenta or cyan in sequence with the color-separated latent images and transferring the developed image onto a single recording paper by matching and overlaying color toner images with each of the color toners. However, placing one toner image on another a number of times causes color drift causing poorer image quality.

On the other hand, with the ink jet method, the colors of the color original are separated by color filters or the like and a value corresponding to the strength of the color is stored in memory. Following this, the color image is reproduced by ejecting ink from various color nozzles in accordance with the content of the memory. Unfortunately, ink-jet recording takes a long time to copy an image.

On the other hand, devices for copying desired color originals using silver halide color-sensitive materials are known. For example, the color copying device with is marketed under the trade name "Cibachrome color copy CC-001" (made by the Ciba Geigy Co. Ltd.) is a copying device which reproduces color images using color-sensitive materials of the so-called silver dye bleach (SDB) method type in which photosensitive silver halides and azo dyes are combined. Copying devices using color-sensitive materials have the advantage that it is possible to reproduce color images of high image quality in a single exposure without creating problems such as the need for a memory to record image data, as in the ink jet method, or color discrepancies which arise from overlaying toner images several times, as in the electrophotographic method.

Normally, in the just-mentioned copying devices, a color positive is used as the original document and color-sensitive reversal materials with which a color positive image is obtained from a color positive original are used as the multi-layer color-sensitive materials.

With multi-layer color-sensitive materials composed of photosensitive silver halide emulsion layers, the color image generally is formed by exposing the original and then passing it through an alkaline development process, but in the case of color-sensitive reversal materials the color positive image is obtained after passing the original through a complicated process involving exposure, then through a stage in which the exposed portions of the silver halide emulsion layers are subjected to black and white development, a stage in which the unexposed portions of the silver halide emulsion layers are exposed, a stage in which the unexposed portions of the silver halide emulsion layers which have then been exposed are subjected to color development processing, and a stage in which bleach-fixing is carried out in order to remove the silver image which forms as a result of the development processing. Furthermore, even when obtaining color images from the abovementioned SDB color-sensitive materials, there will normally be a need for a complicated process requiring at least 3 stages.

As mentioned above, with the electrophotographic method and the ink jet method, it is necessary to reproduce the color image by the color separation of the color original, and therefore there is a great need for at least three exposures and a memory to store the image data. Also, with the electrophotographic method, there is a reduction in image quality because of color discrepancy and the like. With the ink jet method, it takes time to form the copy image. Furthermore, with copying devices which use color-sensitive materials, the development processing stages after exposure are complicated. There is also a need for skill in the control of the development solutions. Also, the devices themselves are large, and their production costs are high. At the same time, the space occupied by machines is further increasing with advances in office automation, and so a reduction in machine size is becoming an essential requirement.

SUMMARY OF THE INVENTION

One object of this invention is to overcome the existing disadvantages accompanying the conventional devices, and to provide a copying device which can reproduce color images of high quality using a simple and small-scale device without the need for several exposure stages or complicated development processing.

The above object of this invention is achieved by a copying machine which includes an image reading device which obtains a trichromatic separated signal by reading an original by photoelectric scanning, an image processing device which effects the desired image processing on the trichromatic separated signal, an exposure device which makes a trichromatic exposure on thermodevelopment and color-sensitive materials by means of the output signal from the image processing device, and a thermodevelopment and transfer device which thermally develops the exposed color-sensitive material and thermally transfers the image to image-receiving materials.

In other words, after making a trichromatic exposure on the thermodeveloping color-sensitive material using the abovementioned exposure device, the latent image formed on the sensitive material is developed by a single heating stage, and the image is further transferred to an image-receiving material by the thermodevelopment and transfer device.

BRIEF DESCRIPTION OF THE DRAWINGS

The foregoing and other object and features of the invention will become apparent from the following detailed description of the preferred embodiments, taken in conjunction with the accompanying drawings, in which.

DETAILED DESCRIPTION OF THE PREFERRED EMBODIMENTS

Figure 1:
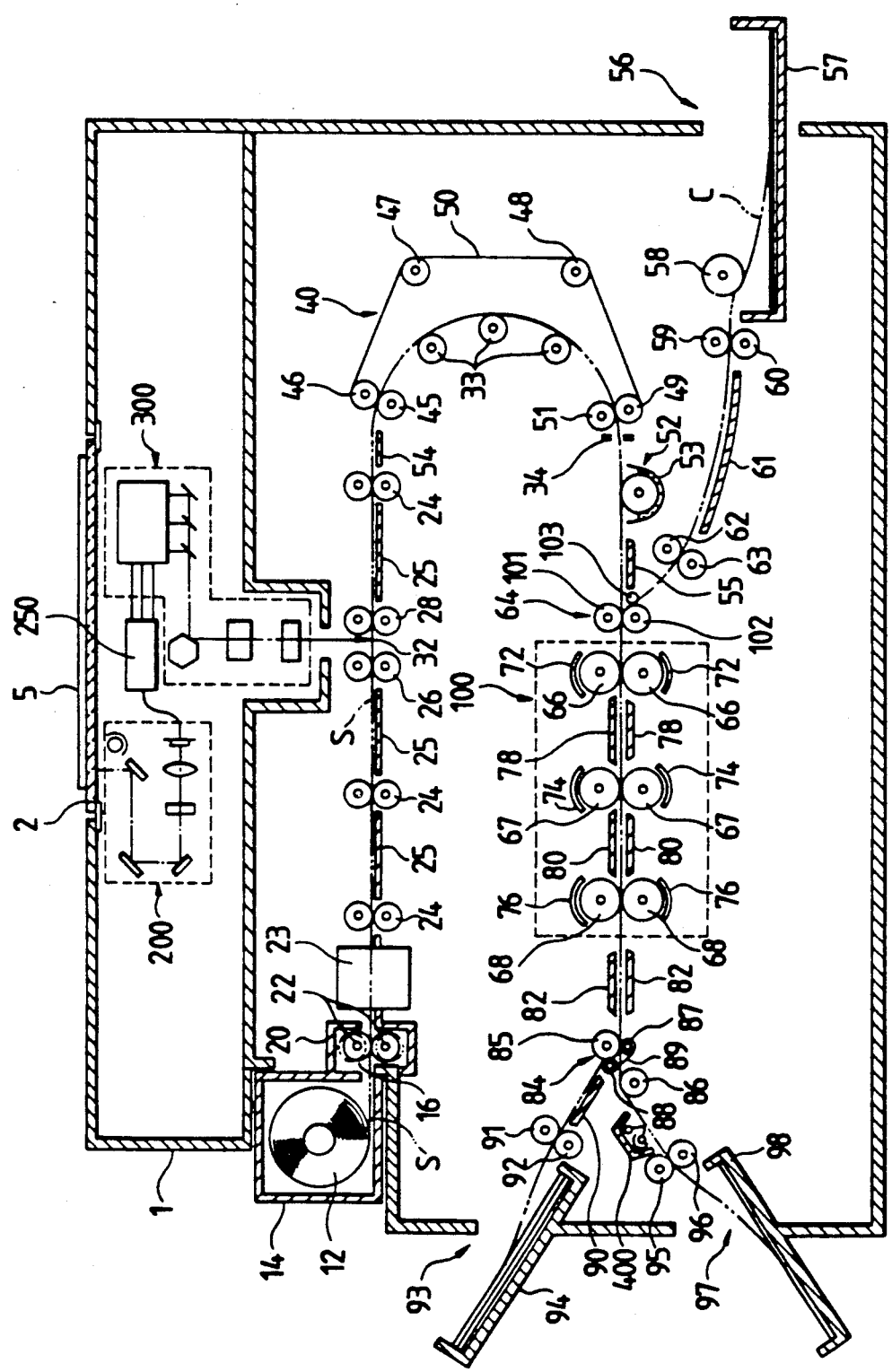
FIG. 1 is a schematic diagram of a copying device in accordance with a first embodiment of the invention.

Referring to the accompanying drawings, embodiments of the present invention now will be described. FIG. 1 is a sectional view of a first embodiment of the present invention, wherein an original supporting glass plate 2 is mounted on the surface of a housing 1 and an original is placed upside down on the surface of the glass plate 2.

An image reading device 200, an image processing device 250 and an exposure device 300 are installed in position under the glass plate 2, which is moved with a rocking motion during an imaging operation, and a heat development photosensitive material S (photosensitive material) is exposed to form a latent image.

On one side of the housing 1 is a cartridge 14 accommodating a roll 12 on which the photosensitive material S is wound, the cartridge 14 being detachably affixed to that side. A pair of delivery rolls 22, 22 contained in a magazine connection darkbox 20 are disposed at an outlet 16 for the photosensitive material S in the cartridge 14, whereby a predetermined length of the photosensitive material S wound on the roll 12 is delivered at a predetermined time. When the front end of the photosensitive material S is approaching, the delivery rolls 22, 22 move away from each other as shown by an imaginary line to facilitate the forward movement of the photosensitive material S. Downstream of the magazine connection darkbox are disposed a cutter unit 23 for cutting the photosensitive material S, a plurality of feed rollers 24 and a plurality of guide plates 25.

Two pairs of nip rolls 26, 28 are disposed on a pass line of the photosensitive material S, the pass line being formed with the pairs of feed rollers 24 and the guide plates 25, so that the photosensitive material S may pass the position where it is exposed by the exposure device 300. An additional pair of feed rolls 24 and a guide plate 25 are disposed downstream of the pair of nip rolls 28.

An inverting device 40 for inverting the exposed photosensitive material S is further disposed ahead of the pair of nip rolls 28. The inverting device 40 is supported with four belt supporting rolls 46, 47, 48, 49 and comprises an endless belt 50 so wound as to form approximately a 180° arc with the aid of feed rolls 33.

The inverting device 40 is further provided with a guide plate 54 for guiding the photosensitive material S supplied from the pair of nip rolls 28 to a nip roll 45. There is also provided a sensor 34 for detecting the front end of the photosensitive material S ahead of a nip roll 51.

A water application part 52 is disposed downstream of the sensor 34. In the water application part 52, water stored in a tank 53 is applied to the photosensitive material S. The wetted photosensitive material S is guided by a guide plate 55 before being sent between contacting pressure rolls 101, 102 of an image-receiving paper superposing device 64.

On the other hand, an image-receiving paper feeder 56 is disposed under the inverting device 40. The image-receiving paper feeder 56 comprises an image-receiving paper cassette 57 which protrudes from the housing 1 and is detachably fitted thereto, an image-receiving delivery roll 58 for delivering image-receiving paper C in the cassette 57, and feed rolls 59, 60, 62, 63 for guiding the image-receiving paper C delivered from the delivery roll 58 along a guide plate 61 between the contacting pressure roll 102 and the nip roll 103.

The water application part 52 may be disposed downstream of the image-receiving paper feeder 56 to apply water to the image-receiving paper side and otherwise may be omitted in the case of a photosensitive material which does not require no water.

A first heating roller 66 of a heat development transfer device 100, which will be described later, may be substituted for the image-receiving paper superposing device 64 comprising the pressure rolls 101, 102.

The heat development transfer device 100 is disposed downstream of the image-receiving paper superposing device 64. A pair of first heating rollers 6, a pair of second heating rollers 67 and a pair of third heating rollers 68 are disposed a predetermined space apart in the heat development transfer device 100.

Heating guide plates 78, 80 for sandwiching the pass line of the heat development photosensitive material S and the image-receiving paper C are disposed between the first and second heating rollers 66, 67 and between the second and third heating rollers 67, 68, respectively. Each of the heating guide plates 78, 80 is equipped with a heater. The first, second and third heating rollers 66, 67, 68 are respectively driven to rotate synchronously with a motor (not shown) as a driving means.

The first, second and third heating rollers 66, 67, 68 are made of rubber and are equipped with respective driving shafts made of conductive material. Heaters 72, 74, 76 are disposed on the respective outer peripheries of these first, second and third heating rollers 66, 67, 68 along the axial direction thereof.

Each of the heaters 72, 74, 76 is fitted with a plurality of heating elements (not shown) along the axial direction of the heating rollers 66, 67, 68, so that each of them can be heated at a plurality of places.

These heaters 72, 74, 76 are connected via a control device (not shown) to a power supply (not shown).

An image-receiving paper peeling device 84 is provided downstream of the heat development transfer device 100 via a guide plate 82. The image-receiving paper peeling device 84 comprises a first feed roll 85, a second feed roll 86, and a peel belt 89 wound onto guide rolls 87, 88 in such a manner as to contact under pressure only the photosensitive material S in both outermost portions of the first feed roll 85.

A waste photosensitive material discharge portion 93 is provided on the upper side of the peeling device 84, and an image-receiving paper take-off portion 97 is provided on the lower side thereof. The waste material discharge portion 93 comprises a guide member 90, a pair of feed rolls 91, 92 and a waste box 94, and is employed to discharge the photosensitive material S sent from the peeling device 84 and guided by the guide member 90 into the waste box 94 using the feed rolls 91, 92. The image-receiving paper take-off portion 97 comprises a pair of feed rolls 95, 96 and a take-off tray 98 for receiving the image-receiving paper C, the take-off tray 98 being protruded from the housing 1.

Figure 2:
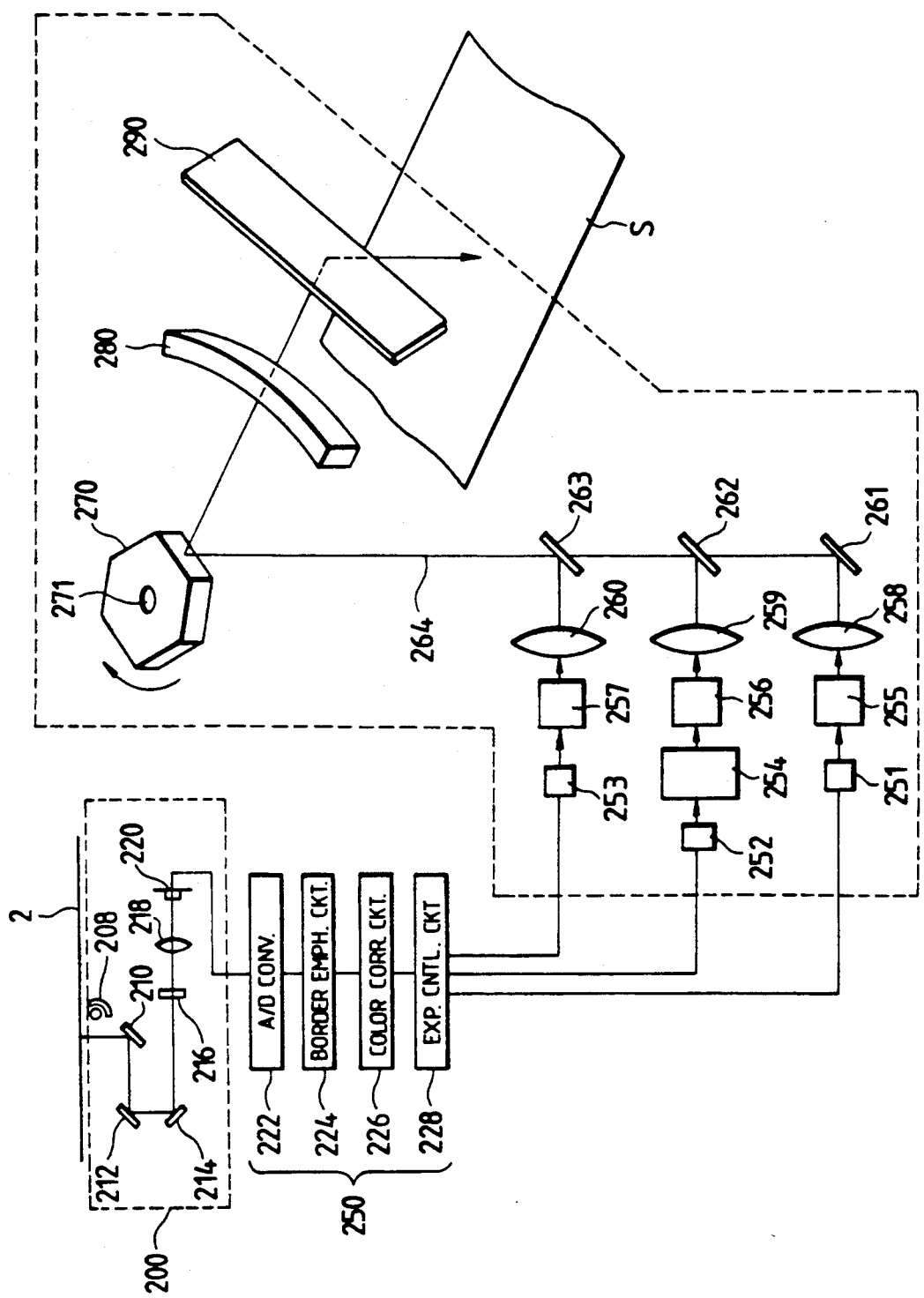
FIG. 2 is a schematic diagram of the image reading, image processing, and exposure devices employed in the first embodiment of the invention.
Figure 3:
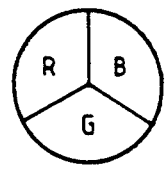
FIG. 3 is a depiction of a crystal filter unit shown in FIG. 2.
Figure 4:
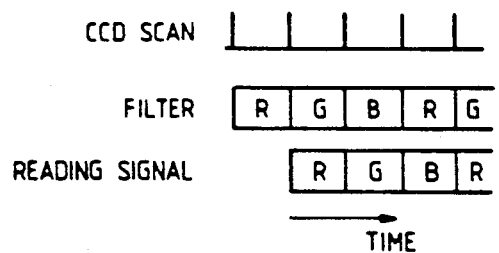
FIG. 4 is a depiction of a signal sequence output by the image reading device of FIG. 2.

FIG. 2 is a schematic diagram of an exposure path line from the image reading device 200 via the image processing device 250 up to the exposure device 300. The image reading device 200 comprises an illuminating lamp 208 for integrally scanning the whole under surface of the glass plate 2, a mirror 210, mirrors 212, 214 for reflecting the light of the illuminating lamp 208 in a direction in which they move at half the speed of the illuminating lamp 208, a liquid crystal filter unit 216 for dividing the light from the mirror 214 into three colors according to a time division method, the crystal filter unit being divided into three color areas on the vertical plane relative to the optical axis as shown in FIG. 3, a image-forming lens 218, and a charge-coupled device (CCD) sensor 220 for performing photoelectric conversion. The filter unit 216 is constantly rotated at high speed by means of a driving unit (not shown) to subject the light from the mirror 214 continuously to the three color time division so that light of successive colors is incident on the CCD sensor 220. The scanning of the CCD sensor 220 and the rotation of the filter unit 216 are synchronized so as to make light of one color incident on the CCD sensor 220 each time the scanning is conducted once. Three color signals R, G, and B are successively read out, as shown in FIG. 4.

In the image processing device 250, the signal read from the CCD sensor 220 is subsequently converted to a digital signal in an analog/digital conversion circuit 222. Subsequently, the deterioration of the spatial frequency response generated by the image-forming lens 218 and the CCD sensor 220 is corrected in a border emphasizer circuit 224 and the exposure of each picture element is determined in a color-correction circuit 226, whereas the exposure of each color is controlled in an exposure control circuit 228. The three colors as a set are caused to radiate from the exposure device 300 to expose the photosensitive material S along the optical axis.

In the exposure device 300, red light is formed by a semiconductor laser 251 for emitting a laser beam having a wavelength of 1,300 nm and a second harmonic generating element (SHG element) 255 for halving the wavelength of the laser beam. The semiconductor laser 251 may be, for example, a model NDL5004 manufactured by NEC corporation. The SHG 255 is an LiNbO$_3$ optical waveguide element, which is used to halve the wavelength of the incident laser beam and emit red luminous flux having a wavelength of 650 nm. The laser beam having a wavelength of 650 nm and emitted from the SHG 255 is passed through a collimator lens 258 for shaping and is reflected by a total reflection mirror 261 toward a polygonal mirror 270.

Green light is formed by an SHG element 256 for halving the wavelength of a laser beam having a wavelength of 1,064 nm and emitted from an Nb:YAG crystal 254 as a result of being excited by a GaSsxP$_{(1-x)}$ semiconductor laser 252. The laser beam having a wavelength of 532 nm and emitted from the SHG 256 is passed through a collimator lens 259 for shaping and is reflected by a dichroic mirror 262 for having the red light passed therethrough but the green light reflected thereat toward the polygonal mirror 270.

Blue light is formed by a semiconductor laser 253 for emitting a laser beam having a wavelength of 850 nm and a SHG element 257 for halving the wavelength of the laser beam. The semiconductor laser 253 may be example, a model NDL3108 manufactured by NEC Corporation. The laser beam having a wavelength of 425 nm and emitted from the SHG element 257 is passed through a collimator lens 260 for shaping and is reflected by a dichroic mirror 263 for having the red and green light passed therethrough but the blue light reflected thereat toward the polygonal mirror 270.

The red, green and blue light beams are reflected by the polygonal mirror 270 via the same optical path 264 and by a mirror 290 via an f$\theta$ lens 280 and reach the photosensitive material S. The image light beams are used to scan and expose the photosensitive material S as the polygon mirror 270 rotates on an axis 271. When the color photosensitive material S which is photo- and pressure-sensitive moves in a direction perpendicular to the scanning direction of the laser beam, an image is formed.

In the exposure device 300, not only the aforesaid laser but also a three color liquid crystal shutter array, a three linear plasma array or a light-emitting diode can be used.

In operation, the front end of the photosensitive material S is arranged so that it is located in the vicinity of the cutting portion of the cutter unit 23 or in the magazine connection darkbox at a stage in preparing the operation of this image recording apparatus, i.e., preparing for making copies.

When a copy start button (not shown) is subsequently pressed, the delivery rolls 22 feeds the photosensitive material S and its front end reaches an exposure position 32. Exposure is started simultaneously along the exposure path line. The path line following the image processing device can be kept dark as in a darkroom because the image reading device 200 and the image processing device 250 are connected by means of an electrical signal. No shutter is necessary, and consequently it is only necessary to control the transport of photosensitive material S and the timing for beginning exposure. When the photosensitive material S is fed by a distance equal to the length of the original in its direction of movement, on the other hand, the cutter unit 23 operates to cut the photosensitive material S.

The exposed and cut photosensitive material S is sent to the inverting device 40 and inverted while it is pressed by the endless belt 50 against the feed rolls 33. When the front end of the photosensitive material S is inverted, the sensor 34 for detecting the front end of the photosensitive material S detects that front end.

In the image-receiving paper feeder 56, the image-receiving paper C is delivered when the copy start button is pressed, or synchronously with the exposure starting timing, and sent up to a position where its front end is nipped between the pressure roll 102 and the nip roll 103. The image-receiving paper C is stopped thereat.

In the image-receiving paper superposing device 64, the image-receiving paper, which is narrower in width than the photosensitive material S, is substantially situated in the central part of the latter in the width direction. The photosensitive material S and the image-receiving paper C are superposed in such a manner that the front ends of both are aligned, or the front end of the material S overhangs by several millimeters the front end of the paper C. The combination of the photosensitive material S and the image-receiving paper C is sent to the heat development transfer device 100 where the image is heat-transferred onto the image-receiving paper.

With the image thus transferred, the photo-sensitive material S is separated from the image-receiving paper C by the peel belt 89 in the peeling device 84 and sent to the waste material discharge portion 93. The image-receiving paper C is led by the feed rollers 95, 96 to the take-off tray 98.

Although the heat development transfer device 100 is heated with the heating rollers 66, 67, 68 in the first embodiment, it may be heated with a belt, a thermal head having its heater elements aligned, a drum, or by application of electricity, microwaves or infrared rays. Another embodiment using a drum for heating purposes will be described later with reference to FIG. 7. Some photosensitive materials S may be heated using eddy currents generated by electromagnetic induction or in a bath filled with a heated liquid which is inert thereto, e.g., fluoric liquid. The heating temperature in these cases normally ranges from 60° C. to 200° C., preferably from 80° C. to 160° C.

Based on the following equations, the border emphasizer circuit 224 compensates for the image by obtaining gradation values Ri', Gi', Bi' after compensation is given to the i-th picture element:

$$Ri' = \alpha_R Ri - \beta_R (R_{i-1} + R_{i+1})$$

$$Gi' = \alpha_G Ri - \beta_G (R_{i-1} + R_{i+1})$$

$$Bi' = \alpha_B Ri - \beta_B (R_{i-1} + R_{i+1})$$

where $\alpha, \beta$ represent compensating coefficients which vary with the color.

The color-correction operational circuit 226 determines the exposure Ci, Mi, Yi of the respective picture elements according to the following equation:

$$\begin{pmatrix} C_i \\ M_i \\ Y_i \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R_i \\ G_i \\ B_i \end{pmatrix}$$

where $a_{11}-a_{33}$ represent compensating coefficients in consideration of the characteristics of the filter, etc.

Figure 5:
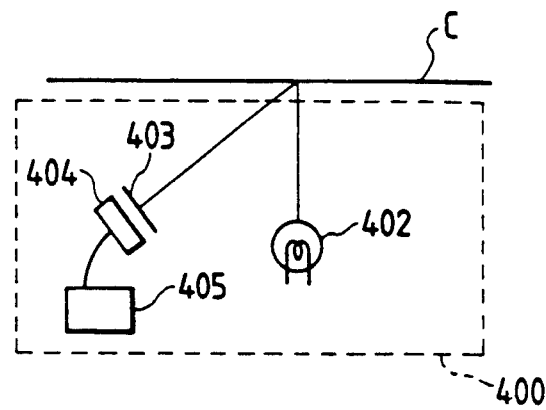
FIG. 5 is a schematic diagram of a sensor used to provide a feedback signal to the image processing device of FIG. 2.

The color-correction operational circuit 226 is provided with an automatic color balance setting mode. In other words, the image-receiving paper C is irradiated with a pattern having a predetermined hue, saturation and lightness derived form the exposure device 300. A sensor 400 provided on the downstream side of the peeling device 84 is employed to detect the hue, saturation and lightness of the pattern transferred to the image-receiving paper C. The detected values are compared with reference values so as to control the compensating coefficients in the color-correction circuit 226. In the sensor 400, the image of the image-receiving material is lighted by the lamp 402, as shown in FIG. 5. The reflected light is divided by a color separation filter 403, and the light is converted by a photoelectric conversion element 404 such as a CCD, a photodiode or an amorphous silicon diode into a photo-analog signal, which is converted by an operational circuit 405 to a digital signal.

Figure 6:
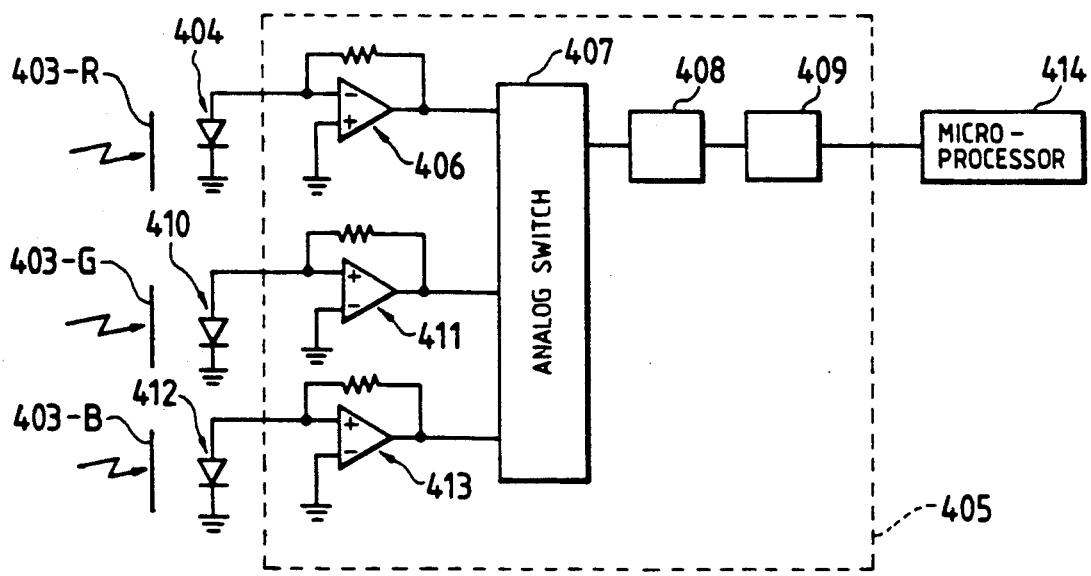
FIG. 6 is a schematic diagram of the operational circuit of FIG. 5.

FIG. 6 is a block diagram of the operational circuit 405. The operational circuit 405 comprises the photoelectric conversion element 404 for converting red light, an operational circuit 406 for making current-to-voltage conversion, an analog switch 407, a sample holding circuit 408, an A/D converter 409, photoelectric conversion elements 410, 412 for respectively converting green and blue light, and operational circuits 411, 413 for their respective elements. A microprocessor 414 controls the compensation by comparing the digital signal from the operational circuit 405 with a reference signal and altering $a_{11}-a_{33}$ in the color-correction operational circuit 226. The alteration of $a_{11}-a_{33}$ may be based on a lookup table (LUT).

The determination of the compensating coefficient of the color-correction operational circuit 226 makes possible online alteration of the compensating coefficients $a_{11}-a_{33}$ without providing the color balance mode by detecting not only the automatic color balance setting mode but also the section where the hue, saturation and lightness are constant on the original and observing the hue, saturation and lightness in the corresponding section of the image-receiving paper C after the transfer of the image by means of the CCD sensor 400, and then determining the compensating coefficients $a_{11}-a_{33}$ in such a manner as to render the values thus detected by the sensor 400 related to the image-receiving paper equal to those on the main scanning line.

Incidentally, because the photosensitive material S in the aforementioned form of the invention is so structured that microcapsules for developing yellow, magenta and cyan colors are dispersed within one layer, the sharpness of the image being recorded becomes inferior to that of a color photosensitive material composed of three emulsion layers for developing yellow, magenta and cyan colors, respectively. In other words, the border of the image tends to become obscure. Since the three separated color signals read by scanning the original are subjected to signal processing (border emphasizing processing) in this form of the invention, clear images are obtainable.

Although the photosensitive material S is cut by the cutter unit 23 each time one piece is exposed in the aforementioned embodiment, moreover, the cutter unit 23 may be omitted, and a take-up roll may be provided in place of the waste box 94.

Figure 7:
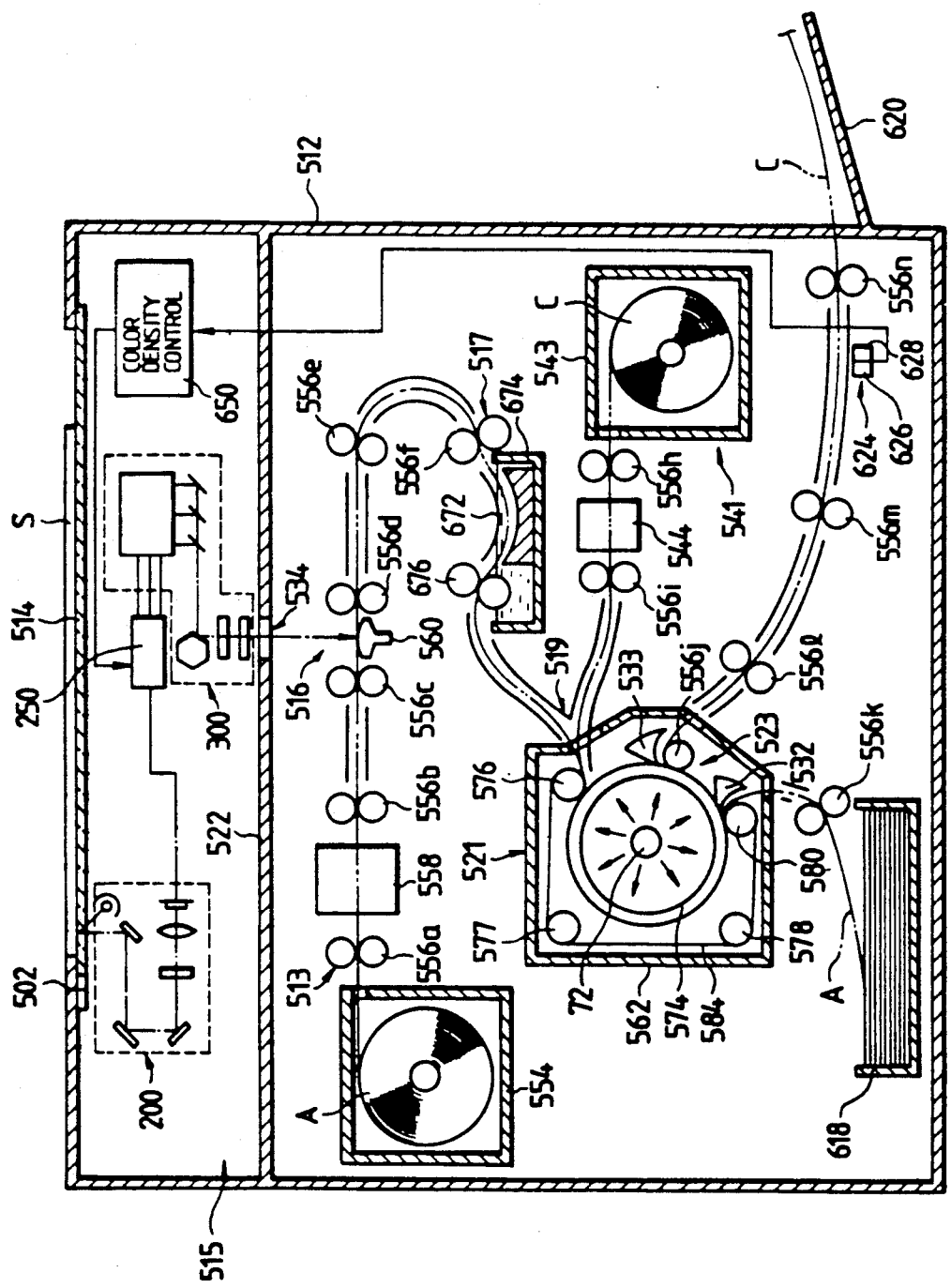
FIG. 7 is a schematic diagram of a copying device according to a second embodiment of the invention.

FIG. 7 is a schematic diagram of a copying machine equipped with a heating drum in the heat development transfer section.

An image reading section 515 including the image reading device 200, the image processing device 250, and the exposure device 300 is similar to what has been applied to the copying machine shown in FIG. 1.

A housing 512 forming the copying machine houses a photosensitive material feeder section 513 for accommodating a photosensitive material A, an image reading section 515 for reading image data loaded on an original S, an exposure section 516 for forming a latent image on the photosensitive material A, a water application section 517 for applying water to the photosensitive material A, an image-receiving paper feeder section 541 for accommodating the image-receiving paper C, a superposing section 519 for superposing the photosensitive material A and the image-receiving paper C, a heat development transfer section 521 for heat-treating the photosensitive material A and the image-receiving paper C, and a peel section 523 for peeling the image-receiving paper C off the photosensitive material A.

A transparent original supporting glass plate 514, on which an original S is mounted, is disposed on the surface of the housing 512, and the image reading section 515 is arranged under the original supporting glass plate 514.

As described in FIG. 1, an image on the original S is read out in the image reading section 515 and the photosensitive material A is exposed in the exposure section 516.

A standard white color plate 502 is provided close to the original supporting glass plate 514 so that it is exposed to a light source 518.

On the other hand, the photosensitive material feeder section 513 is held on the left-hand side of the housing 512, a detachable photosensitive material magazine 554 with the photosensitive material A wound thereon being mounted in the photosensitive material feeder section 513.

Pairs of rollers 556a–556d for carrying the photosensitive material A from the magazine 554 to the exposure section 156 are provided in the photosensitive material feeder section 513. In this case, a cutter 558 for cutting the photosensitive material A into lengths is provided between the pairs of rollers 556a, 556b. Moreover, an exposure stand 560 disposed between the pairs of rollers 556c, 556d faces an exposure opening 534 formed in the bottom of a partition 552 enclosing the image reading section 515.

A path line comprising a pair of rollers 556e and a guide plate is provided downstream of the exposure section 516.

The photosensitive material A is exposed to form a latent image in the exposure section 516, and the photosensitive material A with the formed latent image thus formed is carried via the path line to the water application section 517.

The water application section 517 is designed to facilitate the transfer of the latent image formed on the photosensitive material A, and comprises a pair of rollers 556f, a pair of squeeze rollers 676, a guide plate 672, and a water tank 674. The photosensitive material A is carried while being immersed in the water filled in the water tank 674.

The wetted photosensitive material A is carried by the squeeze rollers 676 to the superposing section 519.

On the other hand, there is provided the image-receiving paper feeder section 541 for feeding the image-receiving paper C on the right-hand side of the housing 512. An image-receiving magazine 543 with image-receiving paper C wound thereon is mounted in the image-receiving paper feeder section 541. The image-receiving paper C in the magazine 543 is delivered by a pair of rollers 556h and cut in lengths by the cutter 544 arranged ahead of the pair of rollers 556h.

The cut image-receiving paper C is carried by a pair of rollers 556i to the superposing section 519.

The heat development transfer section 521 for heating the superposed combination of the photosensitive material A and the image-receiving paper C, developing the latent image on the photosensitive material A and transferring the image onto the image-receiving paper C is provided downstream of the superposing section 519.

The heat development transfer section 521 is enclosed by an insulating partition 562 and includes a hollow cylindrical heating drum 574 containing a halogen lamp 572 and an endless belt 584 wound on the outer periphery of the heating drum 574 at an angle of about 270° and supported with four belt-supporting rollers 576, 577, 578, 580, the photosensitive material A and the image-receiving paper C being heated while both are superposed. As the combination of both materials is heated, the latent image on the photosensitive material A is developed and transferred onto the image-receiving paper C on which color development is actuated.

The peel section 523 is provided inside the partition 562 and comprises a first scraper 532 for peeling the photosensitive material A off the image-receiving paper C, a second scraper 533 for peeling the image-receiving paper C off the heating drum 574, and a discharge roller 556j for discharging the image-receiving paper C from the partition 562.

A waste tray 618 for scrapping the heated and peeled sheet of photosensitive material A and a pair of rollers 556k for discharging the photosensitive material A into the waste tray 618 are provided downstream of one side of the heat development transfer section 521. The waste tray 618 is located under the heat development transfer section 621. Moreover, a take-up tray 620 for accommodating the image-receiving paper C after being heated and pairs of rollers 556l, 556m, 556n for carrying the image-receiving paper C to the take-up tray 620 are provided downstream ahead of the other side of the heat development transfer section 621, whereby the image-receiving paper C bearing the transferred image is led out to the take-up tray 620.

Further, a color density detection unit 624 for detecting the color density of the image on the image-receiving paper C is disposed between the pairs of rollers 556m, 556n. The color density detection unit 624 comprises an illumination device 626 for illuminating the imaging surface of the image-receiving paper C, and a color photosensor 628 for receiving the light reflected from the illuminated image-receiving paper C.

This copying machine further comprises a color density control unit 650 connected to the image processing device 250 and the photosensor 628 and disposed at a suitable position in the housing 512, and a system control (not shown) for controlling the copying machine as a whole, the system control being connected to the color density control unit 650, the photosensitive material feeder section 513, the image reading section 515, a drive system (not shown) of the image reading section 515, the image-receiving paper feeder section 541, the water application section 517, the heat development transfer section 521 and the peel section 523.

In the aformentioned two forms of the present invention, the photosensitive material and the image-receiving material for use may be in sheet or roll form.

Although photosensitive and coloring matter fixing elements of the type shown in the following embodiments 1, 2 and 3 are employed for the aforementioned photosensitive material S, A and image-receiving paper C in the aforesaid forms of the invention, the present invention is not limited to those specifically described.

EXAMPLE 1

The photosensitive element 101 which had the composition shown in Table 1 was prepared.

The preparation method for emulsion (I) for use in layer 1 is now described.

600 ml of an aqueous solution containing sodium chloride and potassium bromide and an aqueous silver nitrate solution (in which 0.59 mole of silver nitrate had been dissolved in 600 ml of water) were simultaneously added over 40 minutes at equal flow rates to a well stirred aqueous gelatin solution (containing 20 g of gelatine and 3 g of sodium chloride in 1,000 ml of water and maintained at 75° C.). A monodisperse cubic silver chlorobromide emulsion (bromine 80 mol %) with an average particle size of 0.35 μ was prepared in this way.

After washing and salting-out, chemical sensitization was carried out at 60° C. with the addition of 5 mg of sodium thiosulfate and 20 mg of 4-hydroxy-6-methyl-1,3,3a,7-tetrazaindene. The emulsion yield was 600 g.

The preparation method for emulsion (II) for use in layer 3 is now described.

Sodium chloride and potassium bromide were included in a well stirred aqueous gelatin solution (which contained 20 g of gelatin and 3 g of sodium chloride in 1,000 ml of water and maintained at 75° C.). 600 ml of aqueous solution, an aqueous silver nitrate solution (in which 0.59 mol of silver nitrate had been dissolved in 600 ml of water) and the following dye solution (I) were simultaneously added over 400 minutes at equal flow rates. A monodisperse cubic silver chlorobromide (bromine, 80 mol %) with an average particle size of 0.35 μ and in which dyes had been absorbed was prepared in this way.

After washing and salting-out, chemical sensitization was carried out at 60° C. with the addition of 5 mg of sodium thiosulfate and 20 mg of 4-hydroxy-6-methyl-1,3,3a7-tetrazaindene. The emulsion yield was 600 g. With the dye solution (I), 160 mg of the following sensitizing dye (D-1) were dissolved in 400 ml of methanol.

dissolved in 1,000 ml of water and maintained at 50° C.) while maintaining a fixed pAg. A monodisperse octahedral silver iodobromide emulsion with an average particle size of 0.5 μ (iodine, 1.5 mole %) was prepared in this way.

After washing and salting-out, gold and sulfur sensitizations were carried out at 60° C. with the addition of 5 mg of chloroauric acid (tetrahydrate) and 2 g of sodium thiosulfate. The emulsion yield was 1 kg.

The preparation method for a gelatin dispersion of dye-donating substances is now described.

13 g of the yellow dye-donating substance (1) 6.5 g of the high-boiling organic solvent (1) and 6.5 g of the electron donor (ED-1) were dissolved by addition to 37 ml of cyclohexanone and, after stirring and mixing with 100 g of a 10% gelatin solution and 60 ml of a 2.5% aqueous sodium dodecylbenzene sulfonate solution, dispersion was carried out in a homogenizer for 10 minutes at 10,000 rpm.

This dispersion is referred to as the yellow dye-donating substance dispersion.

16.8 g of the magenta dye-donating substance (2), 8.4 g of the high-boiling organic solvent (1) and 6.3 g of the electron-donor (ED-1) were dissolved by addition to 37 ml of cyclohexanone and, after stirring and mixing with 100 g of a 10% gelatin solution and 60 ml of a 2.5% aqueous sodium dodecylbenzene sulfonate solution, dispersion was carried out in a homogenizer for 10 minutes at 10,000 rpm. This dispersion is referred to as the magenta dye-donating substance dispersion.

15.4 g of the cyan dye-donating substance (3), 7.7 g of the high-boiling organic solvent (1) and 6.0 g of the electron doner (ED-1) were dissolved by addition to 37

Sensitizing dye (D-1)

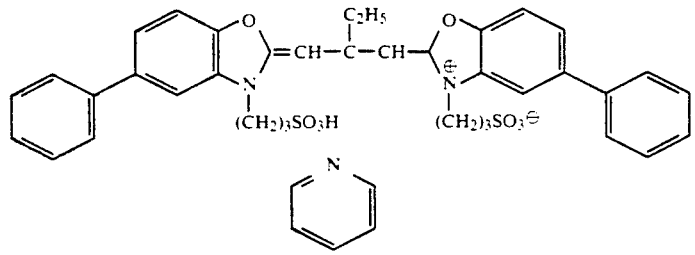

The preparation method for emulsion (III) for use in layer 5 is now described.

1,000 ml of an aqueous solution containing potassium iodide and potassium bromide and an aqueous silver nitrate solution (in which 1 mole of silver nitrate had been dissolved in 1,000 ml of water) were simultaneously added to a well stirred aqueous gelatin solution (in which 20 g) of gelatin and ammonium had been ml of cyclohexanone and, after stirring and mixing with 100 g of a 10% gelatin solution and 60 ml of a 2.5% aqueous sodium dodecylbenzene sulfonate solution, dispersion was carried out in a homogenizer for 10 minutes at 10,000 rpm.

This dispersion is referred to as the cyan dye-donating substance dispersion.

Dye-donating substances.

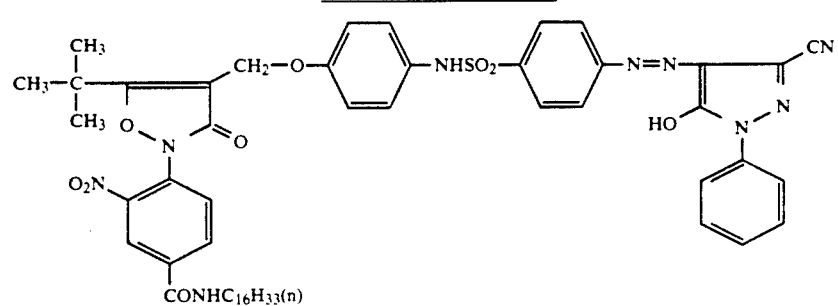

(1)

-continued
Dye-donating substances.

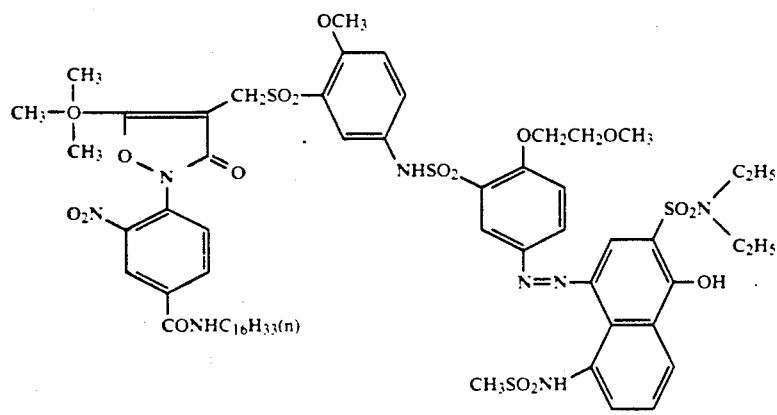

(2)

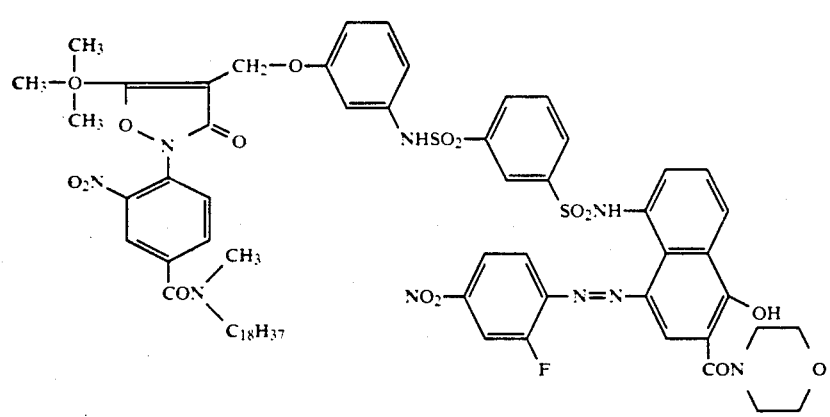

(3)

TABLE 1

| Layer number | Layer type | Product added | Added amount (g/m$^2$) |
|---|---|---|---|
| Layer 6 | Protective layer | Gelatin | 0.91 |
| | | Matting agent (silica) | 0.03 |
| | | Surfactant (1)* | 0.06 |
| | | Surfactant (2)* | 0.13 |
| | | Film hardening agent (1)* | 0.01 |
| | | Zn(OH)$_2$ | 0.32 |
| Layer 5 | Blue-sensitive layer | Emulsion (III) silver amount | 0.35 |
| | | Gelatin | 0.40 |
| | | Antifoggant (1)* | 1.36 × 10$^{-3}$ |
| | | Yellow dye-donating substance (I) | 0.40 |
| | | High-boiling organic solvent (1)* | 0.20 |
| | | Electron donor (ED-1)* | 0.27 |
| | | Surfactant (3)* | 0.05 |
| | | Electron carrier (X)* | 0.03 |
| | | Film hardening agent (1)*1 | 0.01 |
| | | Water-soluble polymer (2)* | 0.02 |
| Layer 4 | Intermediate layer | Gelatin | 0.75 |
| | | Reducing agent (ED02)* | 0.11 |
| | | Surfactant (1)* | 0.02 |
| | | Surfactant (4)* | 0.07 |
| | | Water-soluble polymer (2)* | 0.02 |
| | | Film-hardening agent (1)* | 0.01 |
| Layer 3 | Green-sensitive layer | Emulsion (II) silver amount | 0.25 |
| | | Gelatin | 0.32 |
| | | Antifoggant* | 1.25 × 10$^{-3}$ |
| | | Magenta dye-donating substance (2) | 0.30 |
| | | High-boiling organic solvent (1)* | 0.15 |
| | | Electron donor (ED-1)* | 0.16 |
| | | Surfactant (3)* | 0.04 |
| | | Electron carrier (X)* | 0.03 |
| | | Film-hardening agent (1)* | 0.01 |
| | | Water-soluble polymer (2)* | 0.02 |
| Layer 2 | Intermediate layer | Gelatin | 0.80 |
| | | Zn(OH)$_2$ | 0.31 |
| | | Reducing agent (ED-2)* | 0.11 |
| | | Surfactant (1)* | 0.06 |

TABLE 1-continued

| | | | |
|---|---|---|---|
| | | Surfactant (4)* | 0.10 |
| | | Water-soluble polymer (2)* | 0.03 |
| | | Film-hardening agent (1)* | 0.01 |
| Layer 1 | Red-sensitive layer | Emulsion (I) silver amount | 0.25 |
| | | Sensitizing dye (D-2)* | $5 \times 10^{-4}$ |
| | | Sensitizing dye (D-3)* | $7 \times 10^{-4}$ |
| | | Gelatin | 0.30 |
| | | Antifoggant (1)* | $1.25 \times 10^{-3}$ |
| | | Cyan dye-donating substance (3) | 0.30 |
| | | High-boiling organic solvent (1)* | 0.15 |
| | | Electron donor (ED-1)* | 0.16 |
| | | Surfactant (3)* | 0.04 |
| | | Electron carrier (X)* | 0.03 |
| | | Film hardening agent (1)* | 0.01 |
| | | Water-soluble polymer (2)* | 0.02 |
| | | Support (polyethylene terephthalate; thickness 100μ) | |
| | Backing layer | Carbon black | 0.44 |
| | | Polyester | 0.30 |
| | | Poly(vinyl chloride) | 0.30 |

Water-soluble polymer (2)*

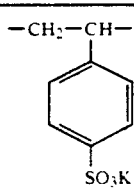

Surfactant (1)*  Aerosol OT

Surfactant (2)*

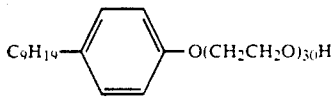

Surfactant (3)*

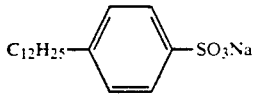

Surfactant (4)*

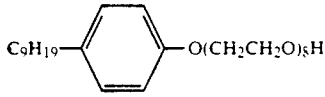

Film hardening agent (1)*  1,2-bis(vinylsulfonylacetamido)ethane
High-boiling organic solvent (1)*  Tricyclohexyl phosphate Antifoggant (1)*

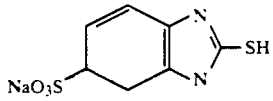

Electron donor (ED-1)

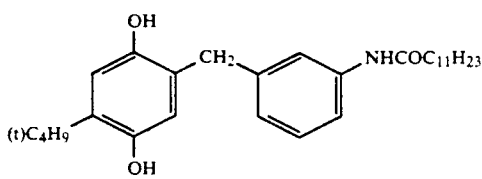

Electron carrier (X)*

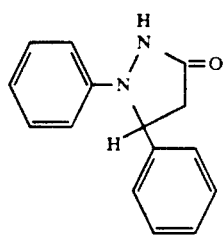

TABLE 1-continued

Reducing agent (ED-2)*

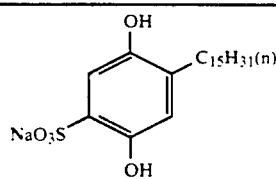

Sensitizing dye (D-2)*

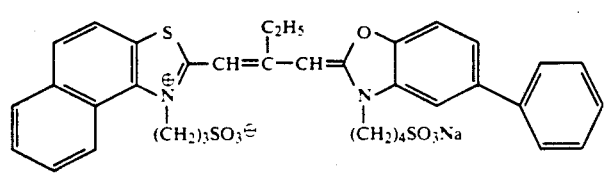

Sensitizing dye (D-3)*

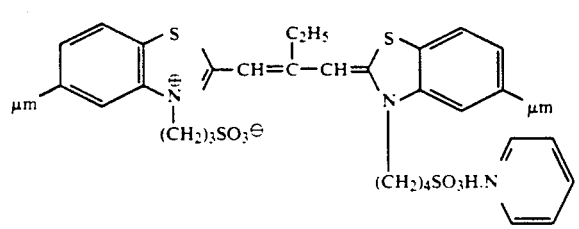

The preparation method for dye-fixing element is now described.

The dye-fixing element R-101 was prepared by coating the constituents of Table 3 onto a support which had been laminated with polyethylene.

TABLE 3

| Layer number | Product added | Added amount (g/m²) |
|---|---|---|
| Layer 3 | Gelatin | 0.05 |
| | Silicone oil *1 | 0.04 |
| | Surfactant *2 | 0.001 |
| | Surfactant *3 | 0.02 |
| | Surfactant *4 | 0.10 |
| | Guanidinium picolinate | 0.45 |
| | Polymer *5 | 0.24 |
| Layer 2 | Mordant *6 | 2.35 |
| | Polymer *7 | 0.60 |
| | Gelatin | 1.40 |
| | Polymer *5 | 0.21 |
| | High-boiling solvent *8 | 1.40 |
| | Guanidinium picolinate | 1.80 |
| | Surfactant *2 | 0.02 |
| Layer 1 | Gelatin | 0.45 |
| | Surfactant *4 | 0.01 |
| | Polymer *5 | 0.04 |
| | Film hardening agent *9 | 0.30 |
| Paper support | laminated with polyethylene (thickness. 170μ) | |
| First backing layer | Gelatin | 3.25 |
| | Film hardening agent *9 | 0.25 |
| Second backing layer | Gelatin | 0.44 |
| | Silicone oil *1 | 0.08 |
| | Surfactant *2 | 0.002 |
| | Matting agent *10 | 0.09 |
| Silicone oil *1 | 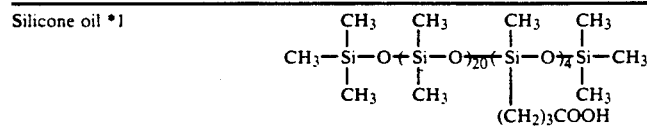 | |
| Surfactant *2 | Aerosol OT | |
| Surfactant *3 | 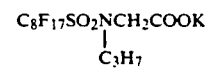 | |
| Surfactant *4 | 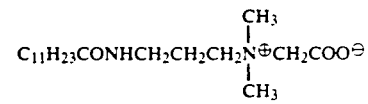 | |
| Polymer *5 | Vinyl alcohol/sodium acrylate copolymer | |

TABLE 3-continued

| | | |
|---|---|---|
| Polymer *7 | (75/25 molar ratio) Dextran (Molecular weight 70,000) | |
| Mordant *6 | 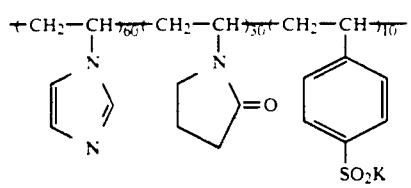 | |
| High-boiling organic solvent *8 | Rheofos 95 (made by the Ajinosu Co., Ltd.) | |
| Film hardening agent *9 | 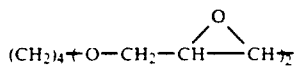 | |
| Matting agent *10 | Benzoguanamine resin average particle side 10μ | |

EXAMPLE 2

TABLE 1

| Layer number | Layer type | Product added | Added amount (g/m$^2$) |
|---|---|---|---|
| Layer 6 | Protective layer | Gelatin | 0.91 |
| | | Matting agent (silica) | 0.116 |
| | | Water-soluble polymer (1) | 0.228 |
| | | Surfactant (1) | 0.064 |
| | | Surfactant (2) | 0.036 |
| | | Film hardening agent | 0.018 |
| | | Surfactant (3) | 0.06 |
| | | Surfactant (6) | 0.072 |
| Layer 5 | Blue-sensitive layer | Emulsion (III) | 0.4 |
| | | Organic silver salt (2) silver amount | 0.036 |
| | | Acetylene compound | 0.022 |
| | | Yellow dye-donating substance (1) | 0.36 |
| | | Yellow dye-donating substance (2) | 0.09 |
| | | High-boiling organic solvent (1)* | 0.225 |
| | | Reducing agent (1) | 0.009 |
| | | Mercapto compound (1) | 0.009 |
| | | Surfactant (3) | 0.06 |
| | | Water-soluble polymer (2) | 0.02 |
| | | Film hardening agent | 0.013 |
| | | Gelatin | 0.64 |
| | | Surfactant (5) | 0.045 |
| Layer 4 | Intermediate layer | Gelatin | 0.7 |
| | | Zn(OH)$_2$ | 0.3 |
| | | Surfactant 91) | 0.001 |
| | | Water-soluble polymer (2) | 0.3 |
| | | Film hardening agent | 0.014 |
| | | Surfactant (4) | 0.029 |
| Layer 3 | Green-sensitive layer | Emulsion (IV) | 0.21 |
| | | Organic silver salt (1) silver amount | 0.035 |
| | | Organic silver salt (2) silver amount | 0.035 |
| | | Gelatin | 0.44 |
| Layer 3 (continued) | Green-sensitive layer | Magenta dye-donating substance | 0.3 |
| | | High-boiling organic solvent (1) | 0.15 |
| | | Reducing agent (1) | 0.006 |
| | | Mercapto compound (1) | 0.003 |
| | | Surfactant (4) | 0.029 |
| | | Water-soluble polymer (2) | 0.013 |
| | | Surfactant (5) | 0.03 |
| | | Film hardening agent | 0.009 |
| Layer 2 | Intermediate layer | Gelatin | 0.77 |
| | | Zn(OH)$_2$ | 0.3 |
| | | Surfactant (4) | 0.047 |
| | | Water-soluble polymer (2) | 0.038 |
| | | Surfactant (1) | 0.046 |
| | | Film hardening agent | 0.016 |
| Layer 1 | Red-sensitive layer | Emulsion (V) | 0.26 |

TABLE 1-continued

| Layer number | Layer type | Product added | Added amount (g/m$^2$) |
|---|---|---|---|
| | layer | Organic silver salt (1) silver amount | 0.035 |
| | | Organic silver salt (2) silver amount | 0.035 |
| | | Mercapto compound (2) | $4 \times 10^{-4}$ |
| | | Cyan dye-donating substance | 0.325 |
| | | High-boiling organic solvent (1) | 0.162 |
| | | Reducing agent (1) | $8.7 \times 10^{-4}$ |
| | | Mercapto compound (1) | 0.013 |
| | | Surfactant (4) | 0.094 |
| | | Surfactant (5) | 0.032 |
| | | Water-soluble polymer (2) | 0.018 |
| | | Gelatin | 0.5 |
| | | Film hardening agent | 0.01 |
| Support (polyethylene terephthalate: thickness 100μ) | | | |
| Backing layer | | Carbon black | 0.44 |
| | | Polyester | 0.30 |
| | | Poly(vinyl chloride) | 0.30 |

High-boiling organic solvent (1) trinonyl phosphate
Water-soluble polymer (highly water-absorbent polymer) (1)
Sumikagel L-5 (H) made by the Sumitomo Chemical Co., Ltd.
Water Soluble polymer (highly water absorbent polymer) (2)

$$-CH_2-CH- \\ | \\ C_6H_4 \\ | \\ SO_3K$$

Surfactant (1) Aerosol OT

Surfactant (2)
$$C_{13}H_{27}CONHCH_2CH_2CH_2-\overset{CH_3}{\underset{CH_3}{\overset{|}{N^\oplus}}}-CH_2COO^\ominus$$

Surfactant (3)
$$C_9H_{19}-\text{C}_6\text{H}_4-O(CH_2CH_2O)_{30}H$$

Surfactant (4)
$$C_9H_{19}-\text{C}_6\text{H}_4-O(CH_2CH_2O)_8H$$

TABLE 1-continued

| Layer number | Layer type | Product added | Added amount (g/m²) |
|---|---|---|---|

Surfactant (5)

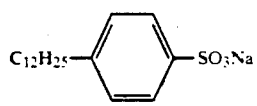

Surfactant (6)

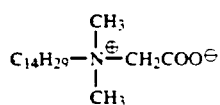

Film hardening agent
1,2-bis(vinylsulfonylacetamido)ethane
Silicone-based oil

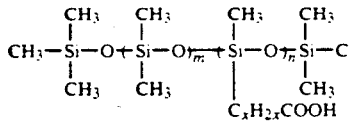

Acetylene compound

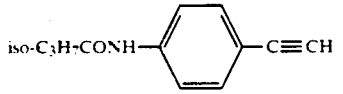

Reducing agent (1)

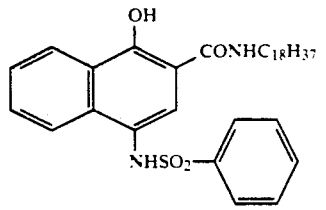

Mercapto compound (1)

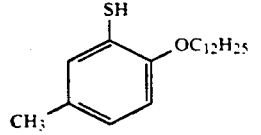

Mercapto compound (2)

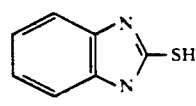

Emulsion (IV)

The following solution I and solution II were added over 70 minutes to a well stirred aqueous gelatin solution (in which 20 g of gelatin, 3 g of sodium chloride and 0.015 g of the compound

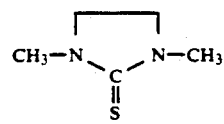

had been dissolved in 800 ml of water and maintained at 65° C.). At the same time as the start of the addition of solution I and solution II, the addition of a dye solution in which 0.24 g of sensitizing dye (A)

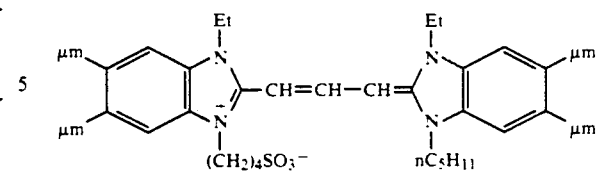

had been dissolved in a (120 cc methanol +120 cc water) solution was begun and the addition was carrier out for 60 minutes.

|  | Solution I (600 ml in total) | Solution II (600 ml in total) |
|---|---|---|
| AgNO₃ (g) | 100 | — |
| KBr (g) | — | 56 |
| NaCl (g) | — | 7 |

Immediately after completing the addition of solution I and solution II, 2 g of KBr were dissolved in 20 ml of water and added and then left for 10 minutes.

After washing and salting-out, 25 g of gelatin and 100 ml of water were added and the pH was adjusted to 6.4 and the pAg to 7.8. The emulsion which was obtained was a monodisperse cubic emulsion with a particle size of approximately 0.5 μ.

This emulsion was maintained at 60 qC and optimal chemical sensitization was carried out with the simultaneous addition of 1.3 mg of triethyl thiourea and 100 mg of 4-hydroxy-6-methyl-1,3,3a,7-tetrazaindene.

Emulsion (V)

The following solution I and solution II were added over 60 minutes to a well stirred aqueous gelatin solution (in which 20 mg of gelatin, 2 g of sodium chloride and 0.015 g of the compound

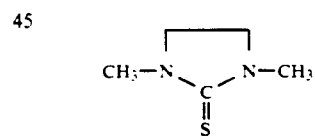

had been dissolved in 800 ml of water and maintained at 65° C.). At the same time as the start of the addition of solution I and solution II, the addition of a dye solution in which 0.1 g of the sensitizing dye (B) and 0.08 g of the sensitizing dye (C)

Sensitizing dye (B)

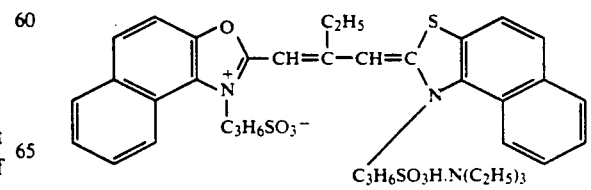

Sensitizing dye (C)

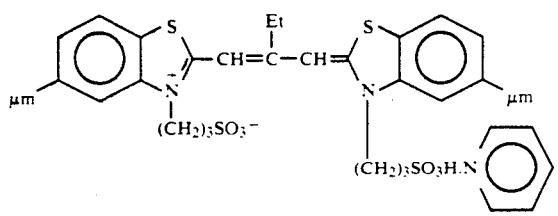

had been dissolved in 80 ml of methanol was begun and the addition was carried out for 40 minutes.

|  | Solution I (600 ml in total) | Solution II (600 ml in total) |
|---|---|---|
| AgNO₃ (g) | 100 | — |
| KBr (g) | — | 56 |
| NaCl (g) | — | 7 |

After completion the addition of solution I and solution II and leaving for 10 minutes, the temperature was lowered, washing and salting-out were performed and then 25 g of gelatin and 100 ml of water were added and the pH adjusted to 6.5 and the pAg to 7.8.

After adjusting the pH and pAg, optimum chemical sensitization was carried out at 60° C. by adding triethyl thiourea and 4-hydroxy-6-methyl,3,3a,7-tetrazaindene.

The emulsion which was obtained was a monodisperse cubic emulsion with a particle size of approximately 8.35 μ, the yield being 650 g.

The preparation method for the organic silver salts is now described.

Organic silver salt (1)

A preparation method for a silver benzotriazole emulsion is now described.

28 g of gelatin and 13.2 g of benzotriazole were dissolved in 300 ml of water. This solution was maintained at 40° C. and stirred. A solution in which 17 g of silver nitrate had been dissolved in 100 ml of water was added to this solution for 2 minutes.

The pH of this silver benzotriazole emulsion was adjusted, precipitation was carried out and the excess salts removed. Following this, the pH was set at 6.30 and a yield of 400 g of silver benzotriazole emulsion was obtained.

Organic silver salt (2)

20 g of gelatin and 5.9 g of 4-acetylaminophenyl-propiolate were dissolved in 1,000 ml of a 0.1% aqueous sodium hydroxide solution and 200 ml of ethanol.

This solution was maintained at 40° C. and stirred.

A solution in which 4.5 g of silver nitrate had been dissolved in 200 ml of water was added to this solution for 5 minutes.

The pH of this dispersion was adjusted, precipitation was carried out the excess salts were removed. Following this, the pH was set at 6.3 and a yield of 300 g of a dispersion of the organic silver salt (2) was obtained.

The preparation method for the dye-donating substance gelatin dispersion is now described.

12 g and 3 g of the yellow dye-donating substances (Y-1) and (Y-2) respectively, 7.5 g of the high-boiling organic solvent (1), 0.3 g of the reducing agent (1) and 0.3 g of the mercapto compound (1) were dissolved by addition to 45 ml of ethyl acetate and, after stirring and mixing with 100 g of a 10% gelatin solution and 60 ml of a 2.5% aqueous sodium dodecylbenzene sulfonate solution, dispersion was carried out in a homogenizer for 10 minutes at 10,000 rpm. This dispersion is referred to as the yellow dye-donating substance dispersion.

15 g of the magenta dye-donating substance (M), 7.5 g of the high-boiling organic solvent (1), 0.3 g of the reducing agent (1) and 0.15 g of the mercapto compound (1) were dissolved by adding to 25 ml of ethyl acetate and, after stirring and mixing with 100 g of a 10% gelatin solution and 60 ml of a 2.5% aqueous sodium dodecylbenzene sulfonate solution, dispersion was carried out in a homogenizer for 10 minutes at 10,000 rpm. This dispersion is referred as the magenta dye-donating substance dispersion.

15 g of the cyan dye-donating substance (C), 7.5 g of the high-boiling organic solvent (1), 0.4 g of the reducing agent (1) and 0.6 g of the mercapto compound (1) were dissolved by adding to 40 ml of ethyl acetate and, after stirring and mixing with 100 g of a 10% gelatin solution and 60 ml of a 2.5% aqueous sodium dodecylbenzene sulfonate solution, dispersion was carried out in a homogenizer for 10 minutes at 10,000 rpm. This dispersion is referred to as the cyan dye-donating substance dispersion.

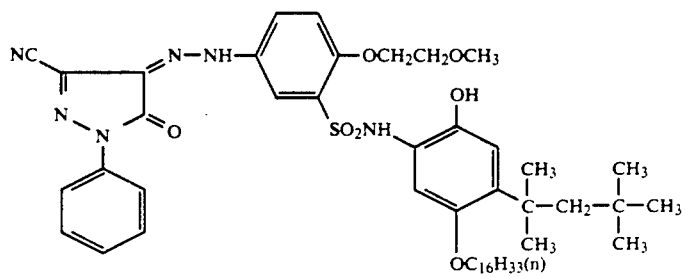

(Y-1)

(Y-2)

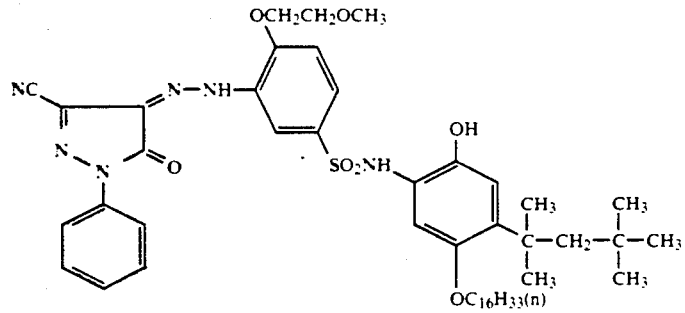

(M)

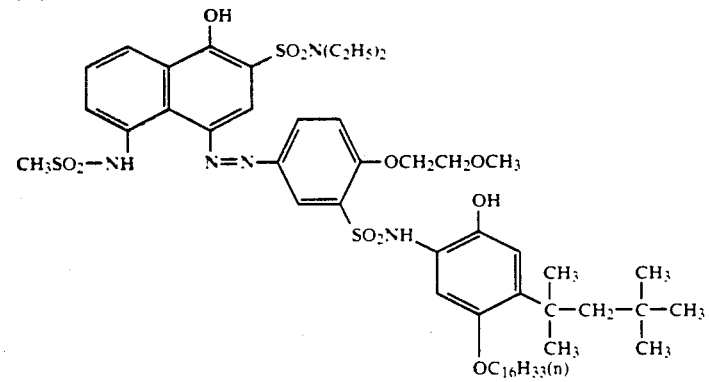

The substances of Example 1 were used for the R sheet.

(C)

[Chemical structure image]

EXAMPLE 3

TABLE 1

| Layer number | Layer type | Product added | Added amount (g/m²) |
|---|---|---|---|
| Layer 6 | Protective layer | Gelatin | 0.9 |
| | | Matting agent (silica) | 0.116 |
| | | Water-soluble polymer (1) | 0.228 |
| | | Surfactant (1) | 0.064 |
| | | Surfactant (2) | 0.036 |
| | | Film hardening agent | 0.018 |
| | | Surfactant (3) | 0.06 |
| | | Surfactant (6) | 0.072 |
| Layer 5 | Infrared-sensitive | Emulsion (IV) | 0.4 |
| | | Sensitizing dye (D) | $8 \times 10^{-5}$ |

TABLE 1-continued

| Layer number | Layer type | Product added | Added amount (g/m²) |
|---|---|---|---|
| | layer | Acetylene compound | 0.022 |
| | | Yellow dye-donating substance (1) | 0.36 |
| | | Yellow dye-donating substance (2) | 0.09 |
| | | High-boiling organic solvent (1)* | 0.225 |
| | | Reducing agent (1) | 0.009 |
| | | Mercapto compound (1) | 0.009 |
| | | Surfactant (3) | 0.06 |
| | | Water-soluble polymer (2) | 0.02 |
| | | Film hardening agent | 0.013 |
| | | Gelatin | 0.64 |
| | | Surfactant (5) | 0.045 |
| Layer 4 | Intermediate layer | Gelatin | 0.7 |
| | | Zn(OH)₂ | 0.3 |
| | | Surfactant 91) | 0.001 |
| | | Water-soluble polymer (2) | 0.03 |
| | | Film hardening agent | 0.014 |
| | | Surfactant (4) | 0.029 |
| Layer 3 | Red-sensitive layer | Emulsion (V) | 0.21 |
| | | Organic silver salt (1) silver amount | 0.035 |
| | | Organic silver salt (2) silver amount | 0.035 |
| | | Gelatin | 0.44 |
| | | Magenta dye-donating substance | 0.3 |
| | | High-boiling organic solvent (1) | 0.15 |
| | | Reducing agent (1) | 0.006 |
| | | Mercapto compound (1) | 0.003 |
| | | Surfactant (4) | 0.029 |
| | | Water-soluble polymer (2) | 0.013 |
| | | Surfactant (5) | 0.03 |
| | | Film hardening agent | 0.009 |
| Layer 2 | Intermediate layer | Gelatin | 0.77 |
| | | Zn(OH)₂ | 0.3 |
| | | Surfactant (4) | 0.047 |
| | | Water-soluble polymer (2) | 0.038 |

TABLE 1-continued

| Layer number | Layer type | Product added | Added amount (g/m²) |
|---|---|---|---|
| Layer 1 | Infrared-sensitive layer | Surfactant (1) | 0.046 |
| | | Film hardening agent | 0.016 |
| | | Emulsion (VI) | 0.26 |
| | | Organic silver salt (1) silver amount | 0.035 |
| | | Organic silver salt (2) silver amount | 0.035 |
| | | Mercapto compound (2) | $4 \times 10^{-4}$ |
| | | Sensitizing dye (E) | $5 \times 10^{-5}$ |
| | | Cyan dye-donating substance | 0.325 |
| | | High-boiling organic solvent (1) | 0.162 |
| | | Reducing agent (1) | $8.7 \times 10^{-3}$ |
| | | Mercapto compound (1) | 0.013 |
| | | Surfactant (4) | 0.094 |

Sensitizing dye (D)

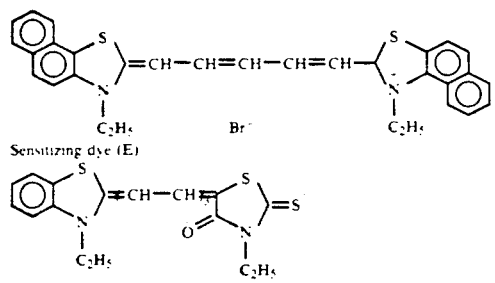

Sensitizing dye (E)

The substances of Example 2 were used for the other raw materials.

Emulsion (VI)

600 ml of an aqueous solution containing 49g of potassium bromide and 10.5 g of sodium chloride and an aqueous silver nitrate solution (in which 0.50 mole of silver nitrate had been dissolved in 600 ml of water) were simultaneously added at equal flow rates over 50 minutes to a well stirred aqueous gelatin solution (in which 20 g of gelatin, 4 g of sodium chloride and 0.02 g of

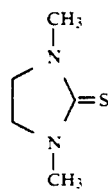

had been dissolved in 1,000 ml of water and maintained at 60° C.). After washing and salting-out, the pH was adjusted to 6.4 by adding 25 g of gelatin and 200 ml of water, optimum chemical sensitization was carried out using triethyl thiourea and 4-hydroxy-6-methyl-1,3,3a,7-tetrazaindene and 700 g of the monodisperse cubic emulsion (I) with an average grain diameter of 0.4 μ were obtained.

Organic silver salt (1)

The preparation method for a silver benzotriazole emulsion is now described.

28 g of gelatin and 13.2 g of benzotriazole were dissolved in 300 ml of water. This solution was maintained at 40° C. and stirred. A solution in which 17 g of silver nitrate had been dissolved in 100 ml of water was added to this solution for 2 minutes.

The pH of this silver benzotriazole emulsion was adjusted, precipitation was carried out and the excess salts removed. Following this, the pH was set at 6.30 and a silver benzotriazole emulsion was obtained with a yield of 400 g.

As mentioned in the above examples, it is possible to provide a layer which is sensitive to any desired light by matching with the light source of the exposure device. As shown in Example 3, it is also possible to obtain a good image by combining a red-sensitive layer and 2 types of infrared-sensitive layers.

It is possible to use, for example, a combination of the substance shown below as the sensitizing dyes used in the infrared-sensitive layers.

1. Sensitizing dyes having sensitivities close to 750 nm.

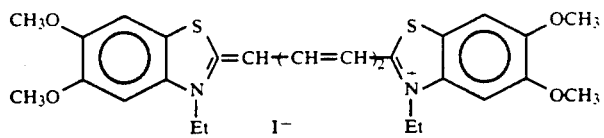

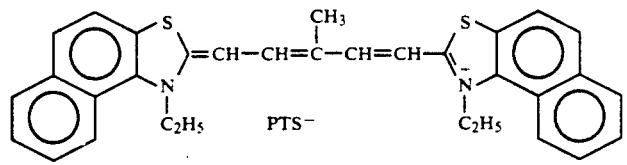

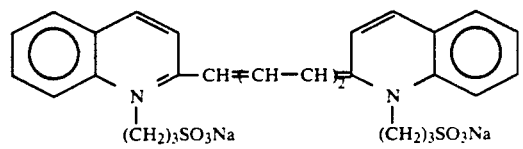

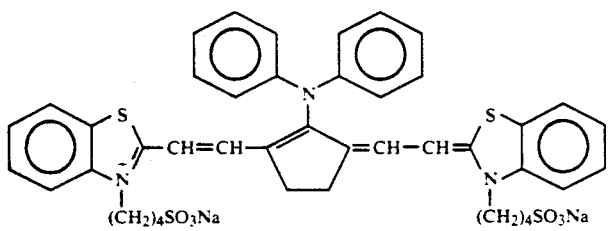
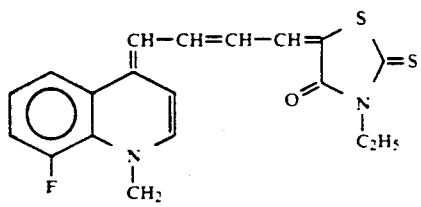
2. Sensitizing dyes having sensitivities close to 810 nm.
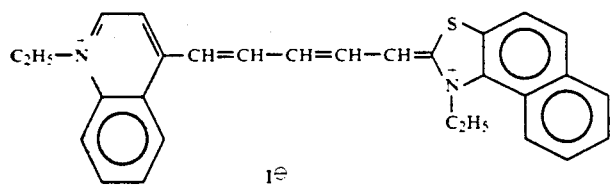
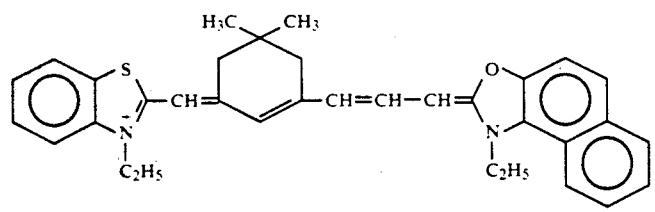
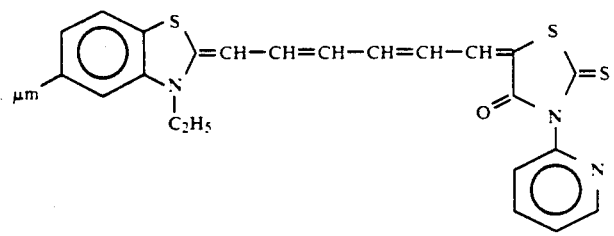
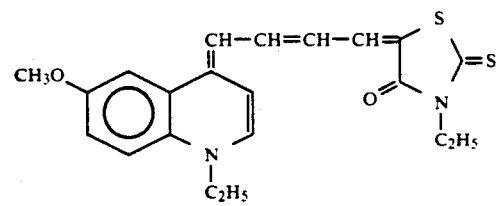
3. Sensitizing dyes having sensitivities close to 850 nm.
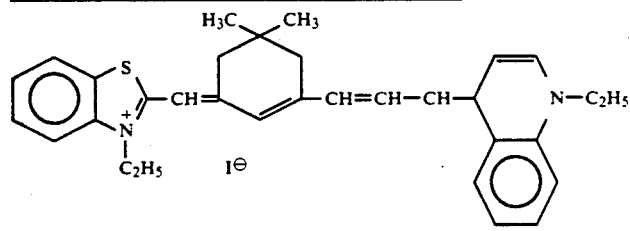

-continued

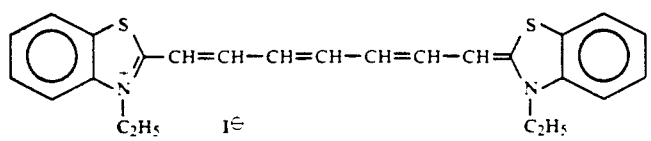

It is possible to use the following combinations as trichromatic exposure light sources which can be used with the thermodeveloping photosensitive elements of the examples mentioned above.

(Illustration 1) For thermodeveloping elements having spectral sensitivities in the red to infrared region:
1. AlGaInP semiconductor later
   (emission excitation wavelength ca. 670 nm)
GaAlAs semiconductor laser
   (emission excitation wavelength ca. 750 nm)
GaAlAs semiconductor laser
   (emission excitation wavelength ca. 810 nm)
2. AlGaInP semiconductor later
   (emission excitation wavelength ca. 670 nm)
GaAlAs semiconductor laser
   (excitation wavelength ca. 780 nm)
GaAlAs semiconductor laser
   (emission excitation wavelength ca. 830 nm)
3. GaAlAs semiconductor later
   (emission excitation wavelength ca. 750 nm)
GaAlAs semiconductor laser
   (emission excitation wavelength ca. 810 nm)
GaAs semiconductor laser
   (emission excitation wavelength ca. 900 nm)

(Illustration 2) For thermodeveloping elements having spectral sensitivities in the blue to red region:
1. GaAlAs semiconductor later
   (emission excitation wavelength ca. 810 nm) +SHG member
AlGaInP semiconductor laser
   (emission excitation wavelength ca. 670 nm)
GaAlAs semiconductor laser
   (emission excitation wavelength ca. 810 nm)
2. YAG:Nd$^{3-}$ semiconductor later
   (emission excitation wavelength ca. 1,060 nm) +SHG member
AlGaInP semiconductor laser
   (emission excitation wavelength ca. 670 nm)
GaAlAs semiconductor laser
   (emission excitation wavelength ca. 810 nm)
3. GaP light-emitting diode
   (emission excitation wavelength ca. 570 nm)
AlGaInP semiconductor laser
   (emission excitation wavelength ca. 670 nm)
GaAlAs semiconductor laser
   (emission excitation wavelength ca. 680 nm)

(Illustration 3) For thermodeveloping photosensitive element having a spectral sensitivity in the visible light region:
1. GaAs semiconductor later
   (emission excitation wavelength ca. 900 nm) +SHG member
InGaAs semiconductor laser
   (emmission excitation wavelength ca. 1,100 nm) +SHG member
AlGaInP semiconductor laser
   (emission excitation wavelength ca. 680 nm)
2. GaAlAs semiconductor later
   (emission excitation wavelength ca. 850 nm) +SHG member
YAG:Nd$^{3+}$ semiconductor laser
   (emission excitation wavelength ca. 1,060 nm) +SHG member
InGaAsP semiconductor laser
   (emission excitation wavelength ca. 1,300 nm) +SHG member FIG. 8 is a schematic sectional view of a silver soft photographic color copying machine according to another embodiment of the present invention.

Figure 8:
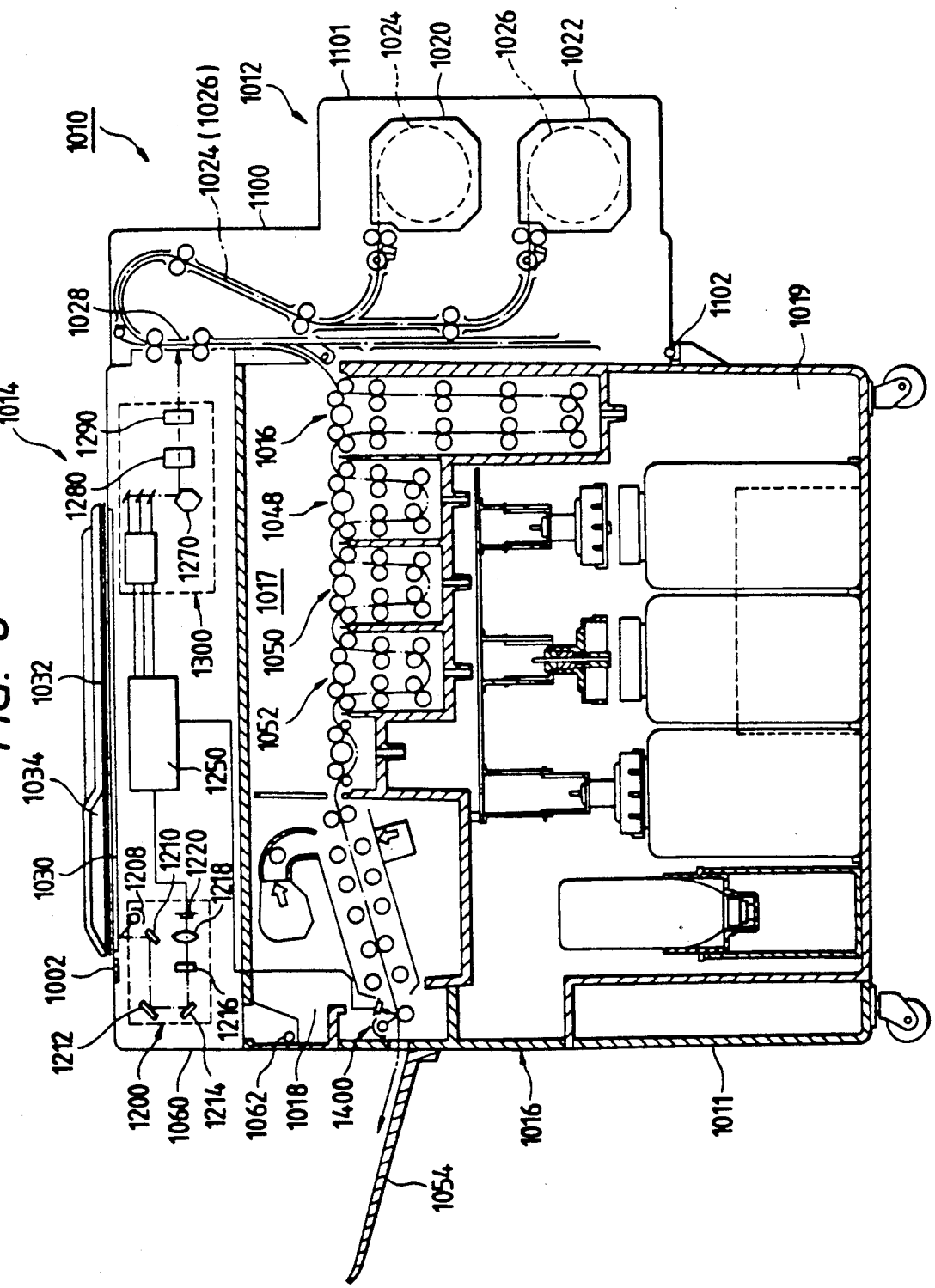
FIG. 8 is a schematic diagram of a copying device according to a third embodiment of the invention.

As shown in FIG. 8, a copy machine body 1011 is equipped with a photosensitive material feed unit 1012 on the right-hand side, an exposure unit 1014 in the upper portion and a processing unit 1016 in the lower portion. The exposure unit 1014 is equipped with an image reading device 1200, an image processing device 1250 and an exposure device 1300. The processing unit 1016 is equipped with a processing section 1017 in the right upper portion, a drying section 1018 in the left upper portion and a spare liquid storing section 1019 in the lower portion, a supply bottle for supplementing a spare liquid being stored in this section.

A pair of magazines 1020, 1022 can be loaded vertically in the photosensitive material feed unit 1012 of this silver salt photographic color copying machine 010 and photosensitive materials 1024, 1026 in the form of rolls are stored therein and delivered to the photosensitive material feed unit 1012 from their respective front ends. The photosensitive material 1024 is, for instance, paper-based, whereas the photosensitive material 1026 is a transparent-film-based.

The photosensitive material 1024 or 1026 taken out of the magazine 1020 or 1022 is sent via the photosensitive material feed unit 1012, which will be described later in detail, to an exposure section 1028 where it is exposed to a color original image on a transparent original receiving plate provided on the exposure unit 1014. The color original 1032 is pressed against the original receiving plate 1030 with an original cover 1034 and illuminated with a light source 1208 in the image reading device 1200. The image of the color original 1032 reflected by a plurality of mirrors 1210, 1212, 1214 is read out by a CCD sensor 1220 via an image-forming lens 1218. The image thus read out is subjected to color correction in the image processing device 1250, whereas the photosensitive material 1024 (1026) is exposed by the exposure device 300 to the image in the exposure section 1028.

The original image or an image by means of a white plate 1002 is input via the mirrors 1210, 1212, 1214 and the lens 1218 to the CCD sensor 1220 at the time of prescanning or while-balance modification, exposure modifying conditions being determined therein.

A developing tank 1046, a bleach-fix bath 1048 and washing tanks 1050, 1052 are successively installed in the processing section 1017 of the processing unit 1016 and the photosensitive material 1024 (1026) is developed, bleached, fixed and washed with a processing liquid filled therein and is sent to the drying section 1018. The washed photosensitive material 1024 (1026) is dried in the drying section 1018 and delivered onto a take-up tray 1054.

Figure 9:
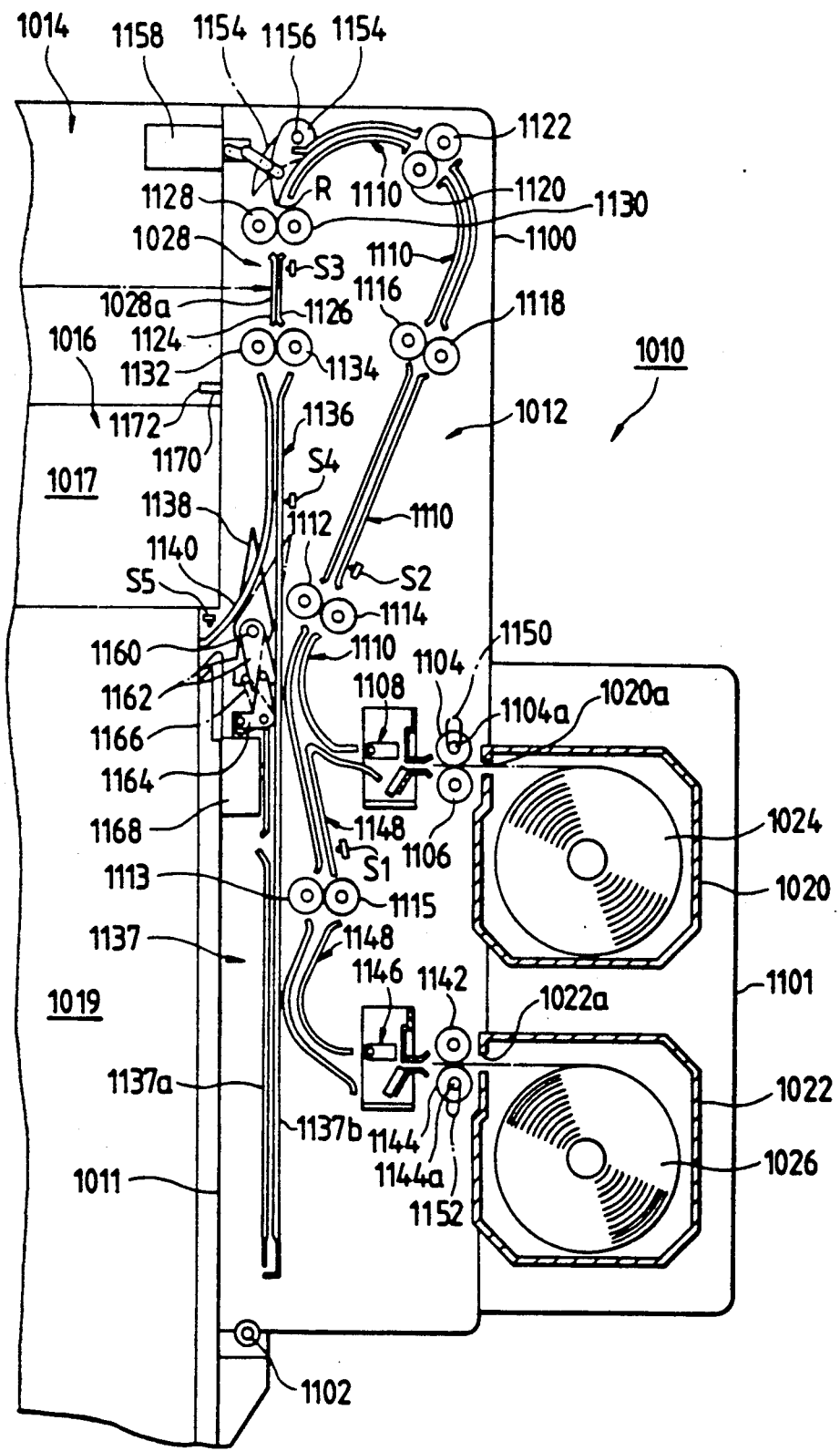
FIG. 9 is a more detailed schematic diagram of a photosensitive material feed unit in FIG. 8.

Referring to FIG. 9, the photosensitive material feed unit 1012 now will be described in detail.

The photosensitive material feed unit 1012 has a photosensitive material path line in a photosensitive material feed frame 1100 and the magazines 1020, 1022 are detachably fitted therein. An open-close cover 1101 is provided outside the magazines 1020, 1022. Moreover, the photosensitive material feed frame 1100 is pivotally supported with the machine body 11 via pin 1102.

Carrier rollers 1104, 1106 corresponding to a slit 1020a as an outlet for the photosensitive material 1024 of the magazine 1020 are horizontally stretched and pivotally supported by the photosensitive material feed frame 1100.

A cutter 1108 is disposed opposite to the magazine 1020 with the carrier rollers 1104, 1106 therebetween. A photosensitive material carrier guide 1110, which is disposed between the cutter 1108 and the exposure section 1028, is and used to guide the photosensitive material 1024 cut into lengths to the exposure section 1028. Carrier rollers 1112, 1114 are disposed on both sides of the carrier guide 1110 and in the vicinity of the cutter 1108. The photosensitive material 1024 received from the cutter 1108 thus is delivered upward in the carrier guide 1110. Carrier rollers 1116, 1118 are disposed thereabove and carrier rollers 1120, 1122 are arranged yet further above those.

The carrier guide 1110, which is in the shape of an inverted U, is used to guide the photosensitive material 1024 to the exposure section 1028.

The exposure section is designed to regulate the exposure position of the photosensitive material 1024 and a glass plate 1124 forming a transparent guide plate facing an image-forming lens 1042 of the exposure unit 1014 is fixedly positioned in the exposure section 1028. A presser plate 1126 forming a back-layer guide plate is pressed against the glass plate 1124. The photosensitive material 1024 delivered from the carrier guide 1110 is passed between the glass plate 1124 and the presser plate 1126 with its emulsion-coated surface up.

In the copying machine according to the present invention, slit-scanning exposure is implemented and consequently the exposure section 1028 can be made smaller, so that the glass plate 1124 and the presser plate 1126 are also made compact.

A pair of carrier rollers 1128, 1130 are provided on the upstream side (upper side) of the exposure section 1028, and a pair of carrier rollers 1132, 1134 are provided on the downstream side (lower side) thereof. These pairs of rollers are used to deliver the photosensitive material 1024 (1026) downward in the vertical direction.

A carrier guide 1136 for vertically downwardly guiding the photosensitive material 1024 is disposed in the lower portion of the exposure section 1028.

A switching guide 1138 is provided vertically in the mid-portion of the carrier guide 1136, whereby the photosensitive material 1024 vertically downwardly conveyed in the carrier guide 1136 is allowed to change its direction of travel, when necessary, to a branched carrier guide 1140 communicating with the processing unit 1016.

On the other hand, carrier rollers 1142, 1144 corresponding to an outlet for the photosensitive material 1026 also are horizontally stretched and the photosensitive material 1026 is delivered from the magazine 1022 arranged under the magazine 1020 to a cutter 1146. A carrier guide 1148 is disposed between the cutter 1146 and the intermediate portion of the carrier guide 1110.

Carrier rollers 1113, 1115 are disposed in the intermediate portion of the carrier guide 1148 so that the photosensitive material 1026 delivered from the carrier rollers 1142, 1144 is relayed to the carrier guide 1110.

As shown in FIG. 9, the carrier rollers 1104, 1144 have their shafts 1104a, 1144a fitted into rectangular slits 1150, 1152 respectively formed in the photosensitive material feed frame 1100, these shafts 1104a, 1144a being movable in directions in which they contact and separate from the carrier rollers 1106, 1142, respectively. These carrier rollers 1104, 1144 are biased by bias means in the direction in which they separate from the respective carrier rollers 1106, 1142 while the open-close cover 1101 is kept open. When the open-close cover 1101 is closed after the magazines 1020, 1022 have been mounted, the carrier rollers 1104, 1144 are moved in the respective rectangular slits 1150, 1152 and are pressed against the carrier rollers 1106, 1142.

The carrier rollers 1130, 1134 located on both sides of the exposure section 1028 are drive rollers and are synchronously driven by a motor (not shown), whereas the carrier rollers 1128, 1132 are driven rollers.

The feed rates of the carrier rollers 1130, 1134 are synchronized with the rate of scanning the original by means of a light source unit 1208. Moreover, the carrier rollers 1112, 1113, 1116, 1120 are also driven by the aforementioned motor. However, the feed rates of the carrier rollers 1116, 1120 are arranged so that they are slightly higher than those of the carrier rollers 1130, 1134 in the exposure section 1028. The carrier rollers 1116, 1120 are made to feed the photosensitive material 1024 (1026) to the carrier roller 1130 at a feed rate higher than those of the carrier rollers 1130, 1134. Consequently, a loop R of the photosensitive material 1024 (1026) shown by an imaginary line of FIG. 9 is formed before the carrier roller 1130. The carrier rollers 1130, 1134 therefore are capable of implementing accurate exposure by feeding the photosensitive material 1024 (1026) to the exposure section 1028 at their own feed rates independent of those of the carrier rollers 1120, 1116.

In this case, as shown in FIG. 9, a rotary guide 1154 corresponding to the emulsion-coated surface of the photosensitive material 1024 (1026) is pivotally supported by a pin 1156 on the upstream sides of the carrier rollers 1128, 1130, i.e., at the downstream side of the carrier guide 1110. On receiving the bias force of a solenoid 1158, the rotary guide 1154 rotates up to the imaginary line, thus causing the loop to be formed in the carrier locus of the photosensitive material 1024 (1026) before the carrier rollers 1128, 1130.

The switching guide 1138 is pivotally supported with the photosensitive material feed frame 1100 with a pin 1160 incorporated therewith. An arm 1162 is secured to the pin 1160 and a pin 1166 projected at one end of a locker arm 1164 meshes with a cut formed in the front end portion of the arm 1162.

The drive force of the solenoid 1168 is applied to the locker arm 1164, and rotates the arm 1164 counterclockwise in FIG. 9. As the solenoid 1168 drives, the switching guide 1138 rotates clockwise in FIG. 9 so as to reach the imaginary line. The photosensitive material 1024 (26) downwardly delivered from the exposure section 28 is fed to the processing unit 1016.

However, the switching guide 1138 remains in the state shown by an actual line of FIG. 9 while the solenoid 1168 is inoperative and accordingly is capable of guiding the photosensitive material 1024 (1026) vertically downwardly from the exposure section 1028 in the carrier guide 1136.

For the carrier guides 1148, 1110, sensors S1, S2 are provided above the carrier rollers 1115, 1114 in order to detect the front end parts of the photosensitive materials 1024, 1026, respectively. Predetermined lengths of the photosensitive materials are fed after their respective front end parts are detected by those sensors and the photosensitive material is then cut into desired lengths. Since the length of the photosensitive material to be fed to the exposure section 1028 is thus adjustable, the color original 1032 can be dealt with properly in terms of its size.

A sensor S3 is provided directly under the carrier roller 1130 to detect the front end part of the photosensitive material prior to exposure and to stop it, so that an image is precisely formed on the photosensitive material at the time of exposure. A sensor S4 is provided directly above the switching guide 1138 to set a position to which the exposed photosensitive material is returned, whereas a sensor S5 is provided near the branched carrier guide 1140 to detect the front end part of the photosensitive material when it is sent to the processing unit 1016.

Figure 10:
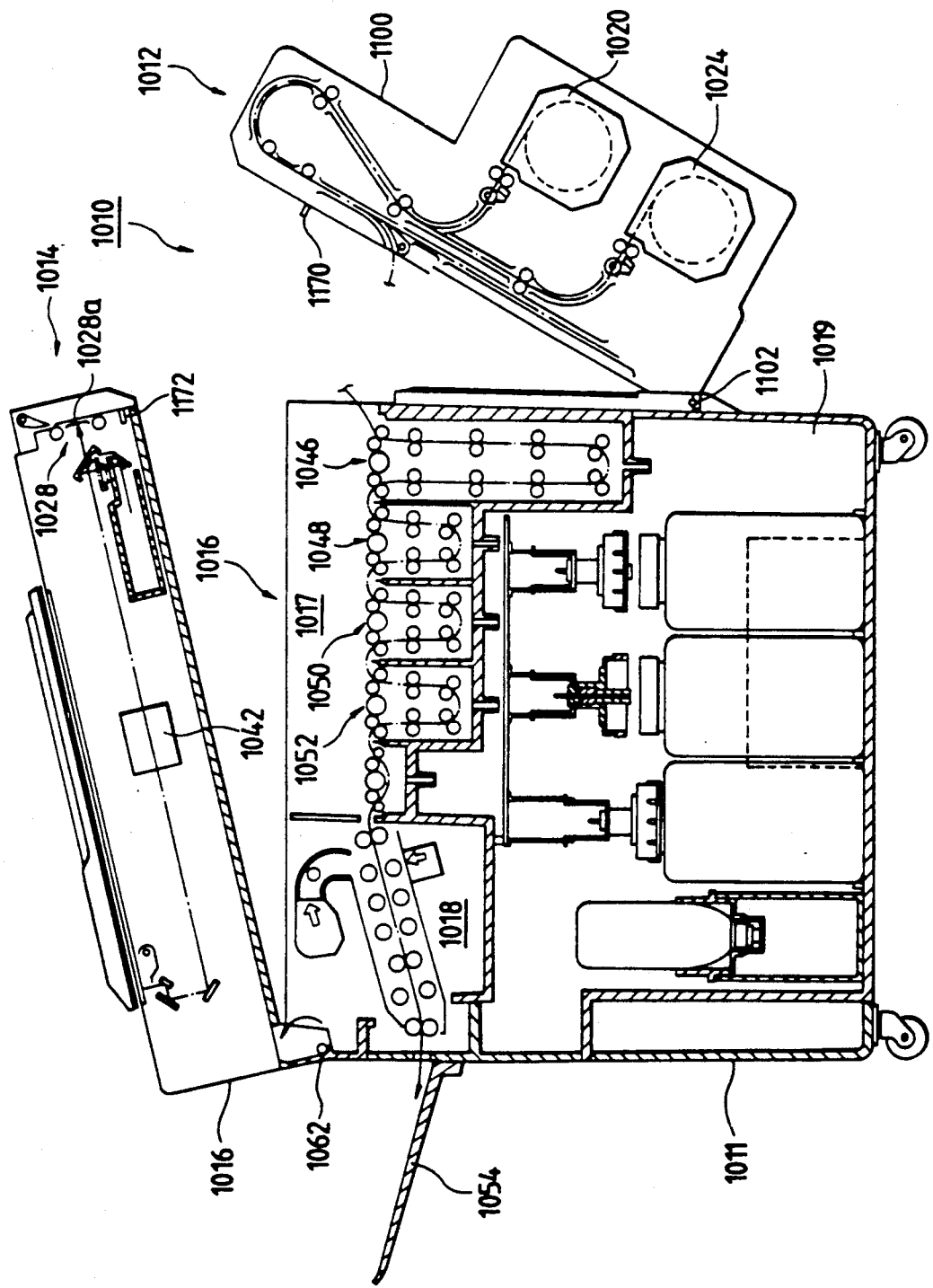
FIG. 10 is a blown-apart view of the copying device of FIG. 8.
Figure 11:
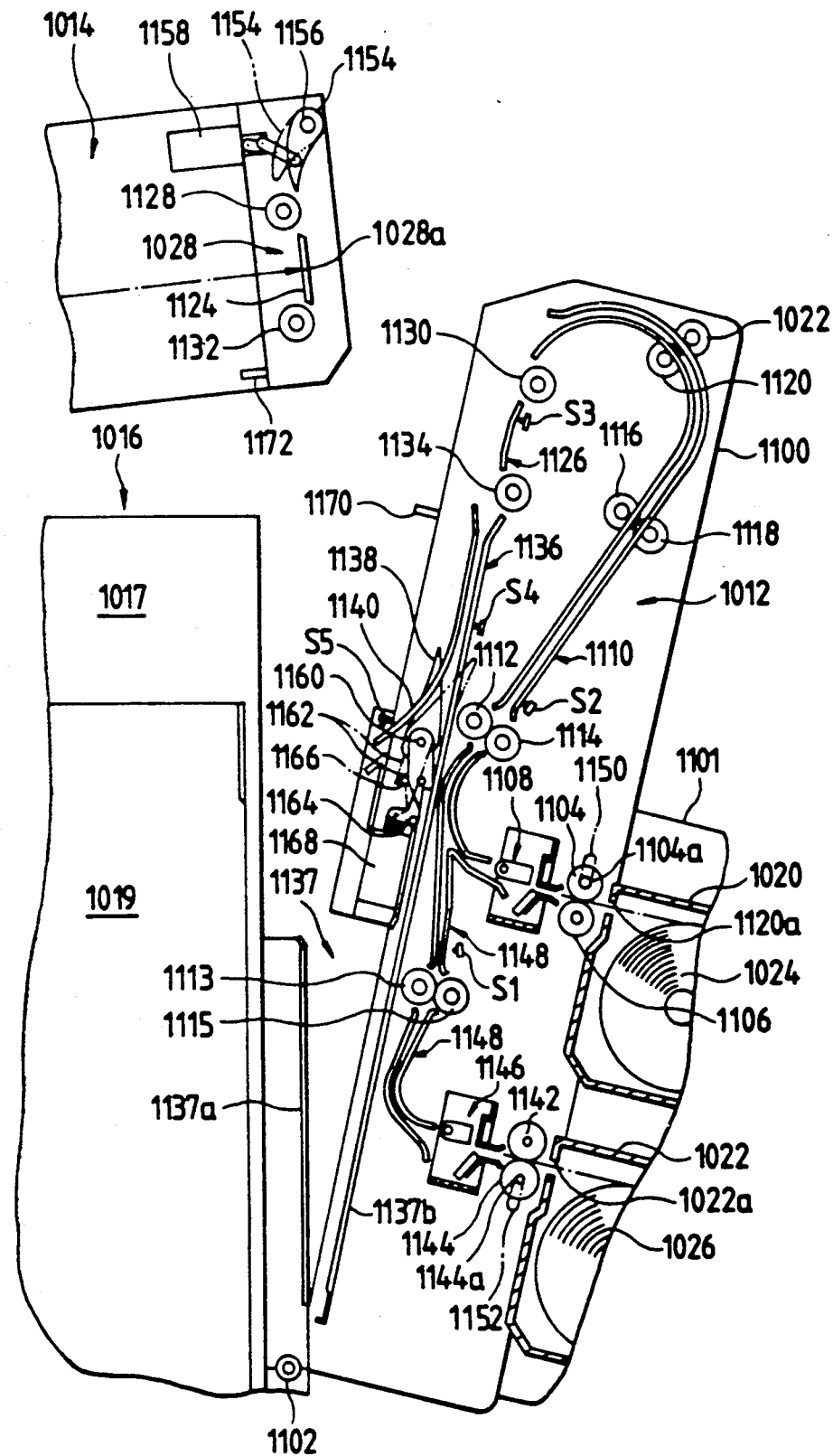
FIG. 11 is a blown-apart view of FIG. 9.

As shown in FIGS. 10 and 11, the copying machine 1010 according to the present invention is arranged so that the photosensitive material feed unit 1012 and the exposure unit 1014 can be opened and closed relative to the processing unit 1016.

More specifically, the photosensitive material feed frame 1100 of the photosensitive material feed unit 1012 is pivotally supported with the machine body 1011 having the processing unit 1016 via the pin 1102. The whole photosensitive material feed unit 1012 rotates clockwise on the pin 1102 as shown in FIG. 10 at the time of adjustment, jamming or maintenance in order to open up the inside of the photosensitive material feed unit 1012.

The exposure unit frame 1060 of the exposure unit 1014 is pivotally supported with the machine body after the photosensitive material feed unit 1012 is released. The whole exposure unit 1014 is caused to rotate counterclockwise on a pin 1062 as shown in FIG. 10 particularly at the time of adjusting the processing unit 1016, eliminating jamming or having effect maintenance to release the upper portion of the processing unit 1016.

When the photosensitive material feed unit 1012 is released from the machine body 1011, most of the photosensitive material carrier mechanism of the copying machine 1010 is released in such a manner as to rest with the photosensitive material feed unit 1012. However, the glass plate 1124 and the carriage rollers 1128, 1132 relative to the rotary guide 1154 located immediately on the upstream side of the exposing section 1028, the pin 1156 pivotally supporting the rotary guide, the solenoid 1158 for driving the rotary guide 1154 and the exposure section 1028 itself are left on the exposure unit 1014 side. Moreover, the processing unit 1016 side portion 1137a of the portion 1137 located lower than the switching guide 1138 of the carrier guide 1136 and located toward the bottom of the overall unit 1010 is left on the processing unit 1016 side in order to release each unit. Needless to say, various carrier guides, rollers and the switching guide 1138 and their driving systems other than those mentioned above are so arranged as to be left in the photosensitive material feed unit 1012.

The present invention is characterized in that, in the exposure section 1028 for regulating the exposure position 1028a, the glass plate 1124 as the transparent guide plate and the two rollers 1128, 1132 out of the two pairs of nip rollers disposed on both sides of the glass plate 1124 are left on the exposure unit 1014 side. On the other hand, the presser plate 1126 as the rear side guide plate for pressing the glass plate 1124 in the exposing section 1028 and the rollers 1130, 1134 on both sides thereof are naturally left in the photosensitive material feed unit 1012.

Incidentally, since the exposure section 1028 is intended to limit the exposure position 1128a, the glass plate 1124 and the presser plate 1126 have to contact each other accurately in terms of the position and strength. The carrier rollers 1128, 1130, 1132 and 1134 also have to contact one another as accurately as possible in similar terms. When the exposure unit 1014 is mounted on the processing unit 1016 and the photosensitive material feed unit 1012 thereafter, it is preferred to provide a plurality of positioning pins and holes into which the pins are justly fitted in the vicinity of the exposure section 1028.

The positioning pins or holes therefor should be provided in the exposure unit 1014, the other being provided in the photosensitive material feed unit 1012. As shown in FIG. 11, for instance, the positioning pins 1170 may be provided in the photosensitive material feed unit 1012, and the holes 1172 therefor may be provided in the exposure unit 1014, or vice versa. When a plurality of pins and holes therefor are provided, their positions may be intermixed.

The operation of the copying machine constructed as set forth above according to the present invention now will be described.

When the open-close cover 1101 is closed after the magazines 1020, 1022 are placed in position as shown in FIGS. 8 and 9, the pairs of carrier rollers 1104, 1106 and 1142, 1144, which are set apart until then, are moved along the respective rectangular slits 1150, 1152 to contact each other, the front end parts of the photosensitive materials 1024, 1026 being held therebetween.

When a copy button (not shown) is pressed, the photosensitive material 1024 or 1026 is selected in conformity with the kind of color original 1032. In this case, the user may be permitted to select the photosensitive material manually after selecting the kinds of color original 1032, or otherwise have the selection of the photosensitive material accomplished by making the exposure unit 1014 automatically read the kind of original 1032 on the original receiving plate 1030.

When the photosensitive material 1024 is selected, for instance, the carrier motor (not shown) is driven to have the carrier rollers 1106, 1112, 1116, 1120 deliver a desired length of the photosensitive material 1024. When the predetermined length of the photosensitive material 1024 is fed after its front end is detected by the sensor S2, the cutter 1108 cuts the photosensitive material 1024 to the desired length. The carrier motor is driven again to send the photosensitive material 1024 to the exposure section 1028, where the photosensitive material is placed on standby at the sensor S3.

The carrier rollers 1120, 1116 for feeding the rear end portion of the photosensitive material 1024 held between the carrier rollers 1128, 1130 at the time of exposure are used to feed the photosensitive material 1024 at a feed rate higher than that of the carrier roller 1130. Simultaneously, the solenoid 1158 is operated so that the rotary guide 1154 is caused to partially expand the loop guiding form of the carrier guide 1110. As a result, the photosensitive material 1024 slackens to form the loop at the entrance of the carrier rollers 1128, 1130. Consequently, the carrier rollers 1128, 1130 are capable of letting the photosensitive material 1024 pass therethrough up to the exposure section 1028 at a constant feed rate equivalent to the drive rates of the carrier rollers 1130, 1134 without being affected by the feed rates of the carrier rollers 1120, 1116 located on the upstream side thereof. The photosensitive material 1024 passing through the exposure section 1028 is exposed to the image from the color original 1032 on the original receiving plate 1030 via the image reading device 1200, the image processing device 1250 and the exposure device 1300.

As the exposure process proceeds, the photosensitive material 1024 is moved down from the carrier rollers 1134, 1132 via the carrier guide 1136. In this case, the switching guide 1138 to which the drive force of the locker arm 1164 is applied remains in the state shown by the continuous line of FIG. 9 because of the operation of the solenoid 1168, and the photosensitive material 1024 sent out of the exposure section 1028 is vertically moved down within the carrier guide 1136. Since the exposed photosensitive material 1024 accordingly is fed into the processing section 1017 of the processing unit 1016, the intermediate portion of the photosensitive material 1024 is prevented from slackening as a result of the difference in feed rate between the photosensitive material feed unit 1012 and the processing section 1017.

Upon the completion of exposure, the carrier motor temporarily rotates in the reverse direction, thus causing the carrier rollers 1130, 1134 to rotate reversely. The rear end part of the exposed photosensitive material 1024 is moved up along the carrier guide 136 and part of the photosensitive material is fed into the carrier guide 1110.

The reverse conveyance is stopped when the front end of the photosensitive material 1024 is located on the upstream side of the switching guide 1138, i.e., when it reaches the sensor S4. Thereafter, the carrier motor is rotated in the same direction as the initial carrying direction. In this case, the switching guide 1138 resumes the state shown by the imaginary line of FIG. 9 because of the operation of the solenoid 1168 and turns the front end of the photosensitive material 1024 off the carrier guide 1136 in order to send it toward the branched carrier guide 1140. The front end of the photosensitive material 1024 is fed into the processing section 1017 of the processing unit 1016 via the branched carrier guide 1140.

In that case, the front end of the photosensitive material 1024 is moved from the sensor S4 position to the sensor S5 position at high speed, whereas the carrier motor speed is so controlled as to become as low as the feed rate in the processing section 1017 when the sensor S5 detects that front end.

The photosensitive material 1024 undergoes development, bleaching, fixation and washing in the processing section 1017 before being sent to the drying section 1018. The dried photosensitive material 1024 is discharged onto the take-up tray 1054. When the photosensitive material 1026 in the magazine 1022 is selected in conformity with the kind of color original 1032 placed on the original receiving plate 1030, a series of steps similar to those mentioned above are repeated.

In case jamming occurs in the photosensitive material path line of the photosensitive material feed unit 1012 of the copying machine 1010 according to the present invention, the photosensitive material feed unit 1012 can be released from the machine body 1011 by turning it clockwise on the pin 1102. Since the exposure section 1028 and the carrier guide 1137 are also released from the center at that time, the photosensitive material or its fragments which can jam the machine readily may be removed.

If the exposure unit 1014 is turned upward on the pin 1062 and is moved to release the processing unit 1016 after the photosensitive material feed unit 1012 is released, the photosensitive material jamming the processing section 1017 and the drying section 1018 of the processing unit 1016 may be easily removed.

The photosensitive material 1024 or 1026 path line in the exposure section 1028 is extremely narrow because this section is used to regulate the exposure position 1028a and therefore it has been arranged to make the photosensitive material 1024 or 1026 tightly adhere to the glass plate 1124 by means of the presser plate 1126, according to the present invention. Accordingly, not only jamming but also the soiling of the glass plate 1124 tends to occur. However, the jammed photosensitive material or the like is readily removable, and the glass plate 1124 is quickly cleanable even though jamming occurs or even though the glass plate 1124 becomes dirty, because the photosensitive material feed unit 1012 is released in such presser plate 1126 constituting the path line in the exposure section 1028 from each other according to the present invention. Moreover, it is unnecessary to call in a special repairman from the manufacturer or sales service station in particular because the user would be able to cancel such jamming or clean the glass plate 1124.

As set forth above, the exposure unit 1014 is set in position after jamming, adjustment, cleaning, etc. have properly been dealt with and the photosensitive material feed unit 1012 is attached to the exposure unit 1114 so that the positioning pin 1170 of the photosensitive material feed unit 1012 is exactly fitted into the hole 1172 of the exposure unit 1014. As a result, the contact position and strength (contact pressure) between the glass plate 1124 and the presser plate 1126, those between the carrier rollers 1128 and 1130 and those between the carrier rollers 1132 and 1134 in the exposure section 1028 can be aligned with accuracy.

The exposure unit 1014 now will subsequently be described.

Figure 12:
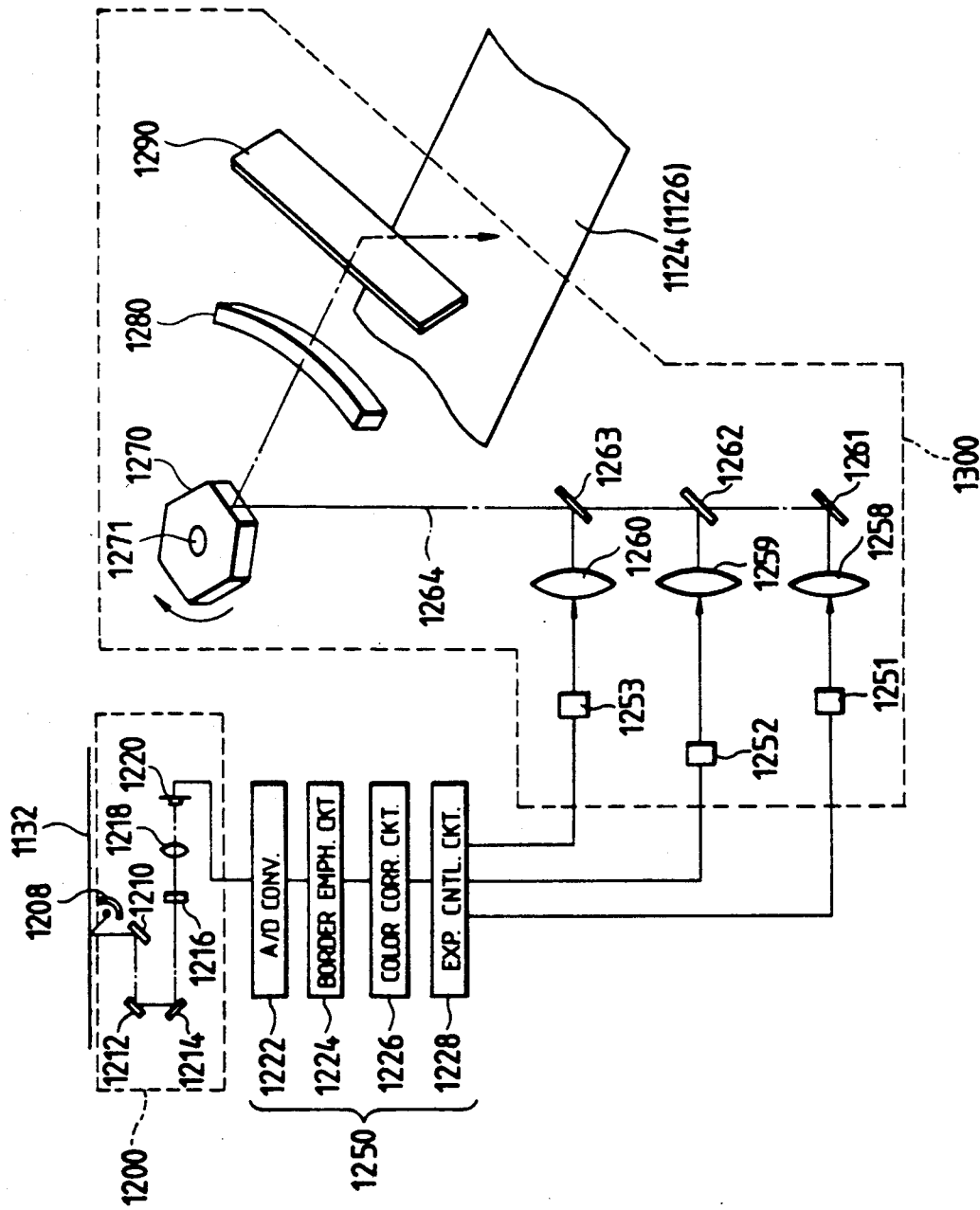
FIG. 12 is a schematic diagram of the image reading, image processing, and exposure devices used in FIG. 8.

FIG. 12 is a schematic diagram of an exposure path line from the image reading device 1200, via the image processing device 1250, up to the exposure device 1300, this exposure path being similar to that of FIG. 2. The image reading device 1200 comprises an illuminating lamp 1208 for integrally scanning the whole undersurface of the glass plate 1002, a mirror 1210, mirrors 1212, 1214 for direction in which they move at half the speed of the illuminating lamp 1208, a liquid crystal filter unit 1216 or dividing the light from the mirror 1214 into three colors in time division fashion, the crystal filter unit being divided into three color areas on the vertical plane relative to the optical axis as shown in FIG. 3, a image-forming lens 1218, and a CCD sensor 1220 for performing photoelectric conversion. The filter unit 1216 is constantly rotated at high speed by means of a driving unit (not shown) to subject the light from the mirror 1214 repetitiously to the three color time division so that light derived from the colors is successively incident on the CCD sensor 1220. The scanning of the CCD sensor 1220 and the rotation of the filter unit 1216 are synchronized so as to make light of one color incident on the CCD sensor 1220 each time the scanning is conducted once. Three color signals R, G, and B are successively read out as shown in FIG. 4.

In the image processing device 1250, the signal read from the CCD sensor 1220 is subsequently converted to a digital signal in an analog/digital conversion circuit 1222. Subsequently, the deterioration of the space frequency response generated by the image-forming lens 1218 and the CCD sensor 1220 is corrected in a border emphasizer circuit 1224 and the exposure of each picture element is determined in a color-correction operational circuit 1226, whereas the exposure of each color is controlled in an exposure control circuit 1228. The three colors as a set are caused to be emitted from the exposure device 1300 to expose the photosensitive material 1024 (1026) along the optical axis.

In the exposure device 1300, light for developing magenta color is formed by a semiconductor laser 1251 for emitting a laser beam having a wavelength of 750 nm. The semiconductor laser 1251 is, e.g., model LT030MF by Sharp Corporation. The laser beam having a wavelength of 750 nm and emitted from the semiconductor laser 1251 is passed through a collimator lens 1258 for shaping and reflected by a total reflection mirror 1261 toward a polygon mirror 1270.

Light for developing cyan color is formed by a semiconductor laser 1252 for emitting a laser beam having a wavelength of 810 nm. The laser beam having a wavelength of 810 nm and emitted from the semiconductor laser 1252 is passed through a collimator lens 1259 for shaping and reflected by a dichroic mirror 1262 for having light for developing magenta color passed therethrough but reflecting light for developing cyan color toward the polygon mirror 1270. The semiconductor laser 1252 is, e.g., model TOLD152R by Toshiba Corporation or model LT010MF by Sharp Corporation.

Light for developing yellow color is formed by a semiconductor laser 1253 for emitting a laser beam having a wavelength of 670 nm. The semiconductor laser 2153 is, e.g., model TOLD9200 by Toshiba Corporation, model NDL3200 by NEC Corporation or model SLDL510 by Sony Corporation. The laser beam having a wavelength of 670 nm and emitted from the semiconductor laser 1253 is passed through a collimator lens 1260 for shaping and reflected by a dichroic mirror 1263 for having light for developing magenta and cyan colors passed therethrough but reflecting light for developing yellow color toward the polygon mirror 1270.

The light beams for developing cyan, magenta and yellow colors are reflected by the polygon mirror 1270 via the same optical path 1264 and by a mirror 1290 via an f$\theta$ lens 1280, and reach the photosensitive material 1024 (1026) The image light beams are used to scan and expose mirror 1270 rotates on an axis 1271. When the photosensitive material 1024 (1026) moves in a direction perpendicular to the scanning direction of the laser beam, an image is formed.

For the exposure device 1300, not only the aforesaid laser but also a three color liquid crystal shutter array, a three linear plasma array or a light-emitting diode can be used.

Based on the following equations, the border emphasizer circuit 1224 compensates for the image by obtaining gradation values Ri', Gi', Bi' after compensation is given for the i-th picture element:

$$Ri' = \alpha_R Ri - \beta_R (R_{i-1} + R_{i+1})$$

$$Gi' = \alpha_G Ri - \beta_G (R_{i-1} + R_{i+1})$$

$$Bi' = \alpha_B Ri - \beta_B (R_{i-1} + R_{i+1})$$

where $\alpha, \beta$ represent compensating coefficients varying with the color.

The color-correction operational circuit 1226 determines the exposure Ci, Mi, Yi of the respective picture elements according to the following equation:

$$\begin{pmatrix} Ci \\ Mi \\ Yi \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} Ri \\ Gi \\ Bi \end{pmatrix}$$

where $a_{11}$–$a_{33}$ represent compensating coefficients based on the characteristics of the filter, etc.

The color-correction operational circuit 1226 is provided with an automatic color balance setting mode. In other words, the image-receiving paper C is irradiated with a pattern having a predetermined hue, saturation and lightness derived from the exposure device 1300. A sensor 1400 provided on the downstream side of the peeling device 1084 is employed to detect the hue, saturation and lightness of the pattern transferred to the image-reference values to control the compensating coefficients in the color-correction operation a circuit 11226. In the sensor 1400, which is similar to the sensor 400 in FIG. 5, the image of the image-receiving material is lighted by the lamp 1402, the reflected light is divided by a color separation filter 1403, and the light is converted by a photoelectric conversion element such as a CCD, photodiode or amorphous silicon diode into a photo-analog signal, which is converted by an operational circuit 1405 to a digital signal.

The operational circuit 1405 is as shown in FIG. 6. The operational circuit 1405 comprises the photoelectric conversion element 1404 for converting red light, an operational circuit 1406 for achieving current-to-voltage conversion, an analog switch 1407, a sample holding circuit 1408, an A/D converter 1409, photoelectric conversion elements 1410, 1412 for respectively converting green and blue light, and operational circuits 1411, 1413 for their respective elements. A microprocessor 1414 controls the compensation by comparing the digital signal from the operational circuit 1405 with a reference signal and altering $a_{11}$–$a_{33}$ in the color-correction operational circuit 1226. The alteration of $a_{11}$–$a_{33}$ may be based on a lookup table (LUT).

The determination of the compensating coefficient of the color-correction operational circuit 1226 may be accomplished by online alteration of the compensating coefficients $a_{11}$–$a_{33}$ without providing the above described automatic color balance setting mode. More specifically, it can be accomplished by detecting a section where the hue, saturation and lightness are constant on the original by the use of the sensor 1220 and observing the hue, saturation and lightness in the section of the image-receiving paper C corresponding to the section after the transfer of the image by the use of the CCD sensor 1400 and then determining the compensating coefficients $a_{11}$–$a_{33}$ so as to render the values detected by the sensors 1220 and 1400 equal to each other.

A variety of photosensitive materials other than the above can be used in the present invention.

EXAMPLE 2

An explanation of the multi-layer color printing paper A is given as an example of a color-sensitive material.

A multi-layer color printing paper with the layer structure shown below was prepared on a paper support which had been laminated on both sides with polyethylene. A coating solution was prepared by mixing and dissolving an emulsified dispersion of emulsion, various reagents and couplers, the respective preparation methods for which are given below.

Preparation of a coupler emulsion: 19.1 g of yellow coupler (ExY) and 4.4 g of color image stabilizer (Cpd-1) were dissolved by the addition of 27.2 cc of ethyl acetate and 7.7 cc of solvent (Solv-1), and this solution was emulsified and dispersed in 185 cc of a 10% aqueous gelatin solution containing 8 cc of 10% sodium dodecylbenzene sulfonate.

Thereafter, the various emulsions for the magenta, cyan and intermediate layers were prepared in a similar way. The compounds used in the respective emulsions are given below.

(ExY) Yellow coupler

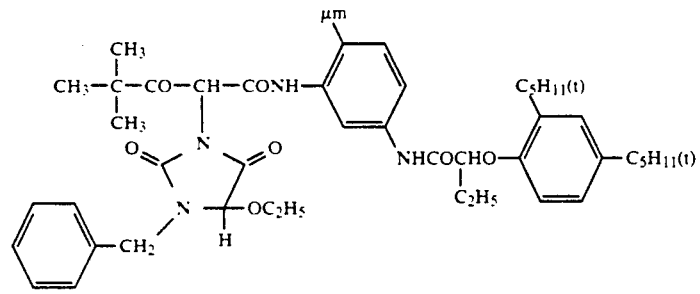

(ExM) Magenta coupler

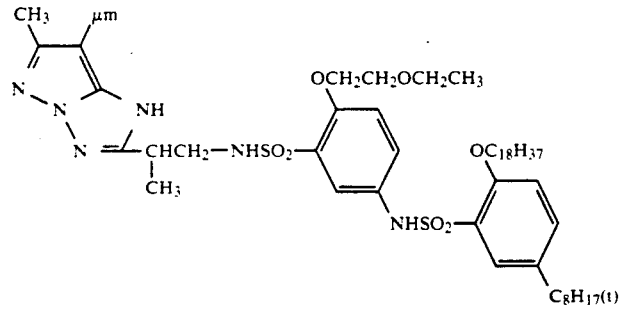

(ExC1) Cyan coupler

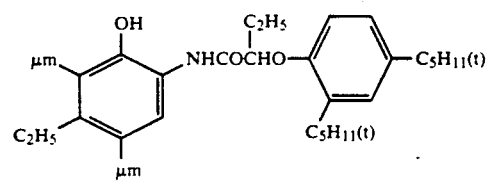

(ExC2) Cyan coupler

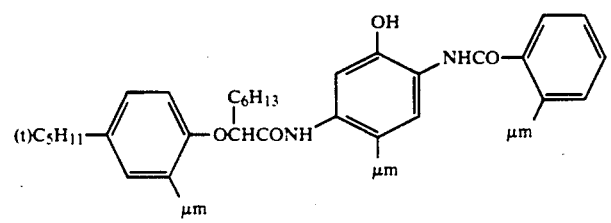

(Cpd-1) Color image stabilizer

-continued
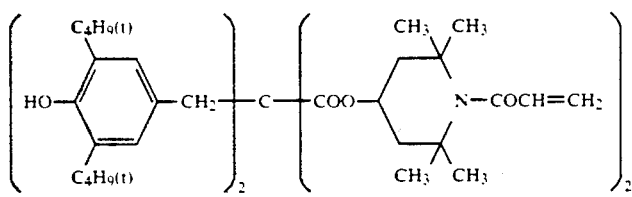
(Cpd-2) Anticolor-mixing agent
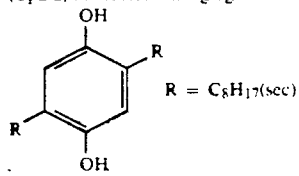
R = $C_8H_{17}(sec)$
(Cpd-3)
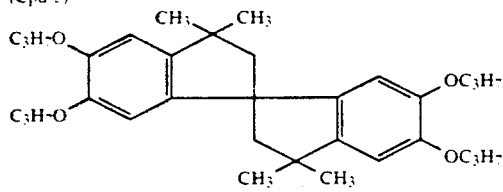
(Cpd-4)
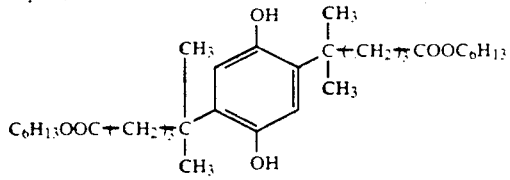
(Cpd-5) Anticolor-mixing agent
As in Cpd-2, except
R = $C_8H_{17}$-(t)
(Cpd-6) Color image stabilizer
A 5:8:9 mixture (by weight of 6a:6b:6c)
(6a)
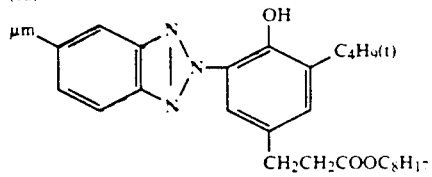
(6b)
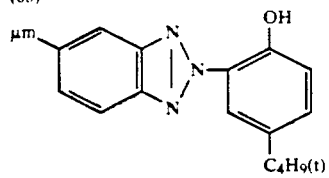
(6c)
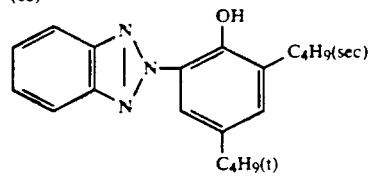
(Cpd-7) Polymer
$+CH_2-CH+_n$
        |
        $CONHC_4H_9(t)$
average molecular weight 80,000

(UV-1) Ultraviolet absorber
A 2:9:8 mixture (by weight) of Cpd-6a:6b:6c (Solv-1) Solvent

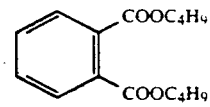

(Solv-2) Solvent
O=P(̶O—C₈H₁₇(iso))₃

(Solv-3) Solvent
O=P(̶O—C₉H₁₉(iso))₃

(Solv-4) Solvent

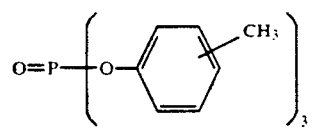

The following dyes were added to the emulsion layers to prevent irradiation.

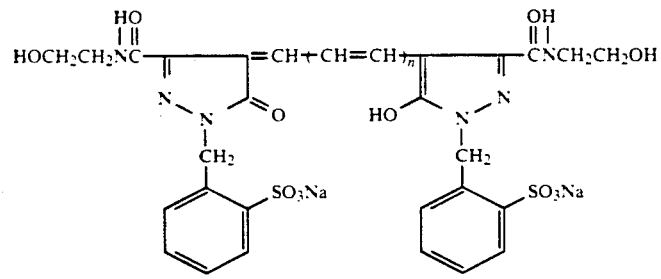

here, n = 2

Green-sensitive layer: the same as Dye-R; but, n=1. $2.6 \times 10^{-3}$ mole of the following compound were added to the red-sensitive emulsion layer for every 1 mole of silver halide.

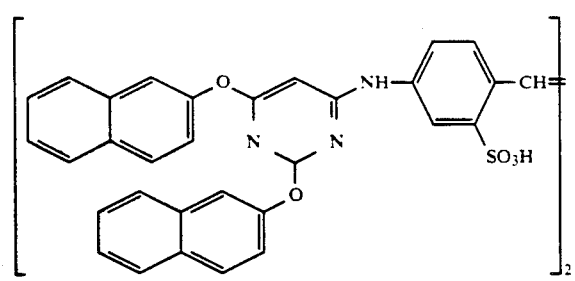

The emulsions used in this example are now given.

Blue-sensitive emulsion: this was made by using a common method to prepare a monodisperse cubic silver chloride emulsion (containing $K_2IrC_{16}$ and 1,3-dimethylimidazole-2-thione) with an average particle size of 1.1 μm and a variation coefficient (the value of the standard deviation divided by the average particle size: s/d) of 0.10, adding 26 cc of a 0.6% solution of the blue spectral sensitizing dye (S-1) to 1.0 kg of this emulsion and further adding 0.05 μm of a fine-grained silver bromide emulsion in a ratio of 0.5 mol % in respect of the host silver chloride emulsion, carrying out ripening followed by optimum chemical sensitization with the addition of sodium thiosulfate and adding $10^{-4}$ mol/mol Ag of a stabilizer (Stb-1).

Green-sensitive emulsion: a common method was used to prepare silver chloride crystals containing $K_2IrC_{16}$ and 1,3-dimethylimidazole-2-thione, after which a monodisperse cubic silver chloride emulsion with an coefficient of 0.10 was prepared by carrying out ripening with the addition of $4 \times 10^{-4}$ mol/mol Ag of a sensitizing dye (S-2) and KBr followed by optimum chemical sensitization with the addition of sodium thiosulfate and then adding $5 \times 10^{-1}$ mol/mol Ag of a stabilizer (Stb-1).

Red-sensitive emulsion: this was prepared in the same way as was the green-sensitive emulsion. However, $1.5 \times 10^{-1}$ mol/mol Ag of the sensitizing dye (S-3) was used instead of the S-2.

The compounds used are now shown.

(S-1) Sensitizing dye

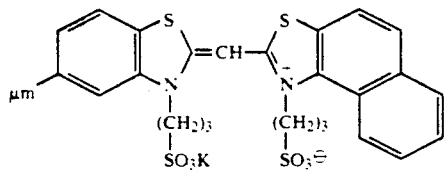

(S-2) Sensitizing dye

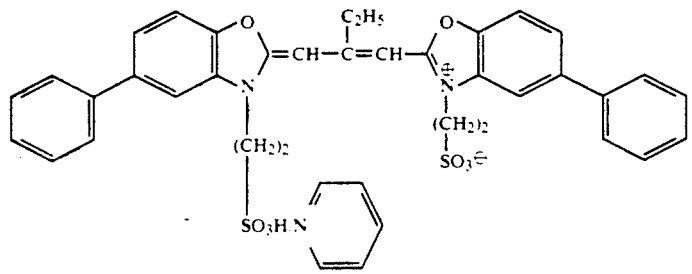

(S-3) Sensitizing dye

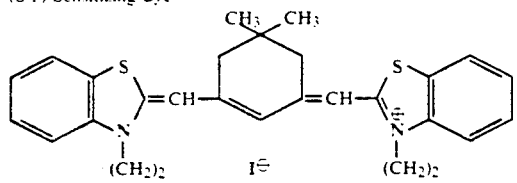

(Stb-1) Stabilizer

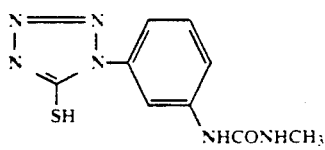

Layer structure

The compositions of the various layers in the material are given below. The figures represent the coated amounts (b/m²). In the silver halide emulsions, they represent the coated amounts calculated as silver.

Support: polyethylene-laminated paper [containing a white pigment (TiO₂) and a blue dye (ultramarine) in the polyethylene on the first layer side].

| First layer (blue-sensitive layer) | |
|---|---|
| Silver halide emulsion | 0.25 |
| Gelatin | 1.86 |
| Yellow coupler (ExY) | 0.82 |
| Color image stabilizer (Cpd 1) | 0.19 |
| Solvent (Solv-1) | 0.35 |
| Second layer (anticolor-mixing layer) | |
| Gelatin | 0.99 |
| Anticolor-mixing agent (Cpd-2) | 0.08 |
| Third layer (green-sensitive layer) | |
| Silver halide emulsion | 0.31 |
| Gelatin | 1.24 |
| Magenta coupler (ExM) | 0.49 |
| Color image stabilizer (Cpd-3) | 0.25 |
| Color image stabilizer (Cpd-4) | 0.12 |
| Solvent (Solv-2) | 0.42 |
| Fifth layer (ultraviolet absorption layer) | |
| Gelatin | 1.58 |
| Ultraviolet absorber (UV-1) | 0.62 |
| Anticolor-mixing agent (Cpd-5) | 0.05 |
| Solvent (Solv-3) | 0.24 |
| Fifth layer (red-sensitive layer) | |
| Silver halide emulsion | 0.21 |
| Gelatin | 1.34 |
| Cyan coupler (a 1:1 blend of ExC1 and C2) | 0.34 |
| Color image stabilizer (Cpd-6) | 0.17 |
| Polymer (Cpd-7) | 0.40 |
| Solvent (Solv-4) | 0.23 |
| Sixth layer (ultraviolet absorption layer) | |
| Gelatin | 0.53 |
| Ultraviolet absorber (UV-1) | 0.21 |
| Solvent (Solv-3) | 0.08 |
| Seventh layer (protective layer) | |
| Gelatin | 1.33 |
| Acrylic modified copolymer of polyvinyl alcohol (17% modification) | 0.17 |
| Liquid paraffin | 0.03 |

Sodium 1-oxy-3,5-dichloro-s-triazine was used as a hardener in each layer.

A process for forming a visible image on the above color printing paper is now given.

| Process | Temperature | Time | Replenishment* Amount | Tank Solution |
|---|---|---|---|---|
| Color development | 38° C. | 55 sec. | 65 ml | 6 l |
| Bleach fixing | 30–36° C. | 45 sec. | 161 ml | 8 l |
| Rinse (1) | 30–37° C. | 20 sec. | — | 4 l |
| Rinse (2) | 30–37° C. | 20 sec. | — | 4 l |
| Rinse (3) | 30–37° C. | 20 sec. | — | 4 l |
| Rinse (4) | 30–37° C. | 30 sec. | 200 ml | 4 l |

-continued

| Process | Temperature | Time | Replenishment* Amount | Tank Solution |
|---|---|---|---|---|
| Drying | 70-80° C. | 60 sec. | | |

*per 1 m² of photosensitive material
(a 4-tank counterflow system from rinse (4) → (1) was adopted.) The compositions of the various processing solutions were as shown below.

| Color Development Solution | Tank Solution | Replenishment Solution |
|---|---|---|
| Water | 800 ml | 800 ml |
| Benzyl alcohol | 14 ml | 36 ml |
| Ethylenediamine-N,N,N',N'-tetramethylene phosphonate | 3.5 g | 6.5 g |
| Organic preservative A (VIII-1) | 0.04 mol | 0.08 mol |
| Sodium chloride | 4.6 g | — |
| Patassium carbonate | 25 g | 25 g |
| N-ethyl-N-(β-methanesulfon-amidoethyl)-3-methyl-4-aminoaniline sulfate | 5.0 g | 12.0 g |
| Organic preservative B (XIV-1) | 0.05 mol | 0.0 mol |
| Fluorescent whitener (4,4'-diaminostilbene-based) | 2.0 g | 4.0 g |
| Water | to 1,000 ml | 1,000 ml |
| pH (25° C.) | 10.05 | 10.85 |

| Bleach fixing solution (the tank solution and replenishing solution are identical) | |
|---|---|
| Water | 400 ml |
| Ammonium thiosulfate (70%) | 100 ml |
| Sodium sulfite | 17 g |
| Ethylenediaminetetraacetic acid, iron (III) ammonium salt | 55 g |
| Ethylenediaminetetraacetic acid, disodium salt | 5 g |
| Ammonium bromide | 40 g |
| Glacial acetic acid | 9 g |
| Water | to 1,000 ml |
| pH (25° C.) | 5.40 |
| Rinse solution (the tank solution and replenishment solution are identical) | |
| Ion exchange water (calcium and magnesium each 3 ppm or less) | |

EXAMPLE 2

The following photosensitive material was prepared using the emulsion 1 given below.

A color photographic material was prepared by the multilayered coating of the following layer 1 to layer 14 on the front and layer 15 to layer 16 on the back of a paper support (thickness, 100 microns) which had been laminated on both surfaces with polyethylene. Titanium white was included as a white pigment and a small amount of ultramarine was included as a blue pigment on the first layer coating side of the polyethylene.

Preparation of emulsion 1

An octahedral monodisperse silver bromide core emulsion with an average grain diameter of approximately 0.40 μm was obtained by adding an aqueous solution of potassium bromide and silver nitrate to an aqueous gelatin solution to which 0.3 g of 3,4-dimethyl 1,3-thiazolene-2-thione had been added for every 1 mol of Ag while stirring vigorously at 75° C. for approximately 20 minutes. The core chemical sensitization process was carried out by heating this emulsion at 75° C. for 80 minutes with the addition of $2.5 \times 10^{-4}$ moles of the following compound (a), 6 mg of sodium thiosulfate and 7 mg of chloroauric acid (tetrahydrate) for every 1 mole of silver. An octahedral monodisperse silver bromide core/shell emulsion with an average grain diameter of approximately 0.7 μm was finally obtained by further subjecting the silver bromide core grains obtained in this way to shell formation under precipitation conditions which were the same as for the first stage. The variation coefficient in the particle size was approximately 10%.

The internal latent image type silver halide emulsion 1 was obtained by carrying out a chemical sensitizing process on the shell by adding 1.5 mg of sodium thiosulfate and 1.5 mg of chloroauric acid (tetrahydrate) to this emulsion for every 1 mole of silver and heating at 60° C. for 60 minutes.

Compound (a)

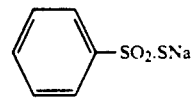

Photosensitive layer composition

The compositions and their coated amounts shown in units of g/m² are given below. Furthermore, silver halides are given as coated amounts calculated as silver. The emulsions used in each of the layers were prepared in accordance with the production method for the emulsion 1. However, a Lippmann emulsion which had not undergone surface chemical sensitization was used for the emulsion inlayer 14.

| Layer 1 (antihalation layer) | |
|---|---|
| Black colloidal silver | 0.10 |
| Gelatin | 1.30 |
| Layer 2 (intermediate layer) | |
| Gelatin | 0.70 |
| Layer 3 (low-speed infrared-sensitive layer) | |
| Silver bromide spectrally sensitized by an infrared-sensitizing dye (ExS-4) (average particle size 0.3μ, size distribution (variation coefficient) 8%, octahedral) | 0.06 |
| Silver bromide spectrally sensitized by an infrared-sensitizing dye (ExS-4) (average particle size 0.45μ, size distribution 10%, octahedral) | 0.10 |
| Gelatin | 0.10 |
| Cyan coupler (ExC-1) | 0.11 |
| Cyan coupler (ExC-2) | 0.10 |
| Anticolor-fading agent (equal amounts of Cpd-2, 3, 4, 13) | 0.12 |
| Coupler dispersant (Cpd-5) | 0.03 |
| Coupler solvent (equal amounts of Solv-7, 2, 3) | 0.06 |
| Layer 4 (high-speed infrared-sensitive layer) | |
| Silver bromide spectrally sensitized by an infrared-sensitizing dye (ExS-4) (average particle size 0.60μ, size distribution 15%, octahedral) | 0.14 |
| Gelatin | 1.00 |
| Cyan coupler (ExC-1) | 0.15 |
| Cyan coupler (ExC-2) | 0.15 |
| Anticolor-fading agent (equal amounts of Cpd-2, 3, 4, 13) | 0.15 |
| Coupler dispersant (Cpd-5) | 0.03 |
| Coupler solvent (equal amounts of Solv-7, 2, 3) | 0.10 |
| Layer 5 (intermediate layer) | |
| Gelatin | 1.00 |
| Anticolor-mixing agent (Cpd-7) | 0.08 |
| Anticolor-mixing agent solvent (equal amounts of Solv-4, 5) | 0.16 |

| | |
|---|---|
| Polymer latex (Cpd-8) | 0.10 |
| Layer 6 (low-speed red-sensitive layer) | |
| Silver bromide spectrally sensitized by red-sensitizing dyes (ExS-1, 2, 3) (average particle size 0.25μ, particle size distribution 8%, octahedral) | 0.04 |
| Silver bromide spectrally sensitized by red-sensitizing dyes (ExS-3, 4) (average particle size 0.45μ, particle size distribution 11%, octahedral) | 0.06 |
| Gelatin | 0.80 |
| Magenta coupler (equal amounts of ExM-1, 2) | 0.11 |
| Anticolor-fading agent (Cpd-9) | 0.10 |
| Antistaining agent (equal amounts of Cpd-10, 22) | 0.014 |
| Antistaining agent (Cpd-23) | 0.001 |
| Antistaining agent (Cpd 12) | 0.01 |
| Coupler dispersant (Cpd-5) | 0.05 |
| Coupler solvent (equal amounts of Solv-4, 6) | 0.15 |
| Layer 7 (high-speed red-sensitive layer) | |
| Emulsion 1 spectrally sensitized by red-sensitizing dyes (ExS-1, 2, 3) (average particle size 0.60μ, particle size distribution 16%, octahedral) | 0.10 |
| Gelatin | 0.80 |
| Magenta coupler (ExM-1, 2) | 0.10 |
| Anticolor-fading agent (Cpd-9) | 0.10 |
| Antistaining agent (equal amounts of Cpd-10, 22) | 0.013 |
| Antistaining agent (Cpd-23) | 0.001 |
| Antistaining agent (Cpd-12) | 0.01 |
| Coupler dispersant (Cpd-5) | 0.05 |
| Coupler solvent (equal amounts of Solv-4, 6) | 0.15 |
| Layer 8 (intermediate layer) | |
| Identical to layer 5 | |
| Layer 9 (yellow filter layer) | |
| Yellow colloidal silver | 0.20 |
| Gelatin | 1.00 |
| Anticolor-mixing agent (Cpd-7) | 0.06 |
| Anticolor-mixing agent solvent (equal amounts of Solv-4, 5) | 0.15 |
| Polymer latex (Cpd-8) | 0.10 |
| Layer 10 (intermediate layer) | |
| Identical to layer 5 | |
| Layer 11 (low-speed infrared-sensitive layer) | |
| Silver bromide spectrally sensitized by a red-sensitizing dye (ExS-5) (average particle size 0.45μ, particle size distribution 8%, octahedral) | 0.07 |
| Silver bromide spectrally sensitized by red-sensitizing dyes (ExS-5, 6) (average particle size 0.60μ, particle size distribution 14%, octahedral) | 0.10 |
| Gelatin | 0.50 |
| Yellow coupler (ExY-1) | 0.22 |
| Antistaining agent (Cpd-11) | 0.00 |
| Anticolor-fading agent (Cpd-6) | 0.10 |
| Coupler dispersant (Cpd-5) | 0.05 |
| Coupler solvent (Solv-2) | 0.05 |
| Layer 12 (high speed infrared-sensitive layer) | |
| Emulsion 1 spectrally sensitized by an infrared-sensitizing dye (ExS-5) (average particle size 1.2μ, particle size distribution 21%, octahedral) | 0.25 |
| Gelatin | 1.00 |
| Yellow coupler (ExY-1) | 0.41 |
| Antistaining agent (Cpd-11) | 0.00 |
| Anticolor-fading agent (Cpd-6) | 0.10 |
| Coupler dispersant (Cpd-5) | 0.05 |
| Coupler solvent (Solv-2) | 0.10 |
| Layer 13 (ultraviolet absorption layer) | |
| Gelatin | 0.15 |
| Ultraviolet absorber (equal amounts of Cpd-1, 3, 13) | 1.00 |
| Anticolor-fading agent (equal amounts of Cpd-6, 14) | 0.06 |
| Dispersant (Cpd-5) | 0.05 |
| Ultraviolet absorber solvent (equal amounts of Solv-1, 2) | 0.15 |
| Antiirradiation dye (equal amounts of Cpd-15, 16) | 0.02 |
| Antiirradiation dye (equal amounts of Cpd-17, 18) | 0.02 |
| Layer 14 (protective layer) | |
| Fine silver chlorobromide grains (silver chloride 97%, average particle size 0.2μ) | 0.05 |
| Acrylic modified copolymer of polyvinyl alcohol (17% modification) | 0.02 |
| Equal amounts of polymethylmethacrylate particles (average particle size 2.4 microns) and silicon oxide (average particle size 5 microns) | 0.05 |
| Gelatin | 1.50 |
| Gelatin hardener (H-1) | 0.17 |
| Layer 15 (backing layer) | |
| Gelatin | 2.50 |
| Layer 16 (rear surface protective layer) | |
| Equal amounts of polymethylmethacrylate particles (average particle size 2.4 microns) and silicon oxide (average particle size 5 microns) | 0.05 |
| Gelatin | 2.00 |
| Gelatin hardener (H-1) | 0.11 |

In the various photosensitive layers, ExZK-1 was used as a nucleating agent at $10^{-3}$ wt. % with respect to the amount of coated silver halide and Cpd-24 was used as a nucleation accelerator at $10^{-2}$ wt. %. Furthermore, Alkanol XC (Du Pont Co.) and sodium alkylbenzenesulfonate were used as auxiliary emulsifiers and dispersants and a succinic acid ester and Magefac F-120 (made by the Dainippon Ink Co., Ltd.) were used as auxiliary coating agents in various layers. Compounds-19, 20 and 21 were used as stabilizers in the silver halide and colloidal silver-containing layers. This was taken as sample number 401. The structural formulae of compounds used in the examples are now shown.

ExS-1

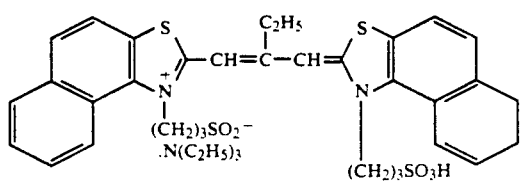

ExS-2

-continued
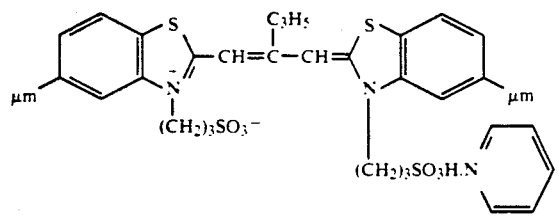
ExS-3
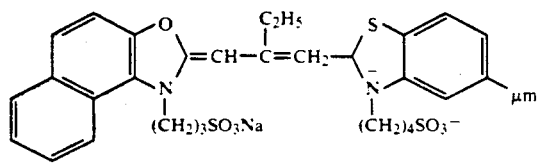
ExS-4
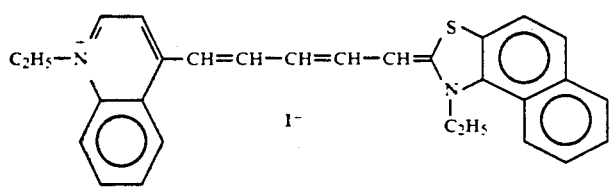
ExS-5
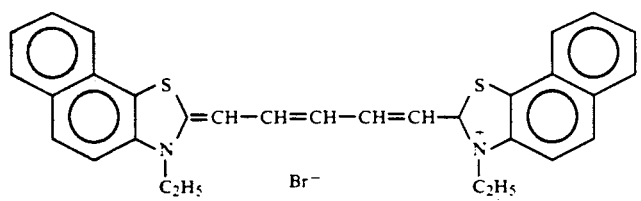
Cpd-1
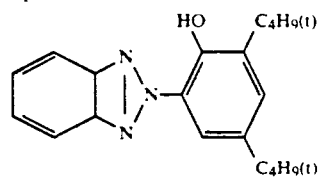
Cpd-2
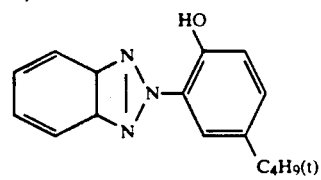
Cpd-3
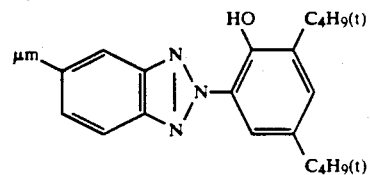
Cpd-4

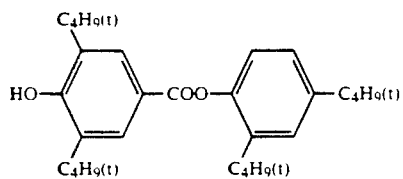
Cpd-5
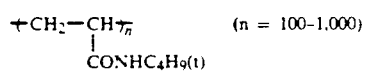     (n = 100-1,000)
Cpd-6
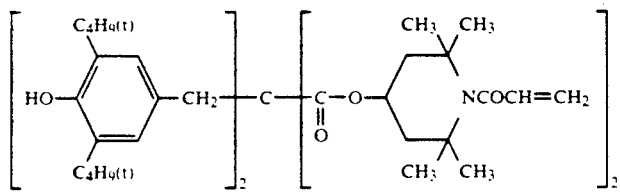
Cpd-7
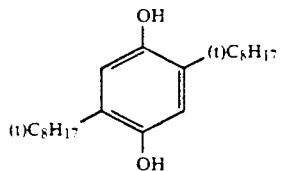
Cpd-8
polyethyl acrylate
Cpd-9
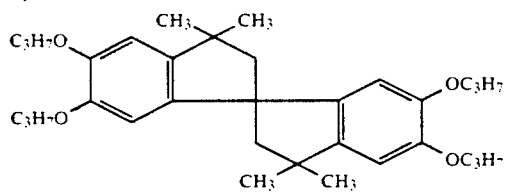
Cpd-10
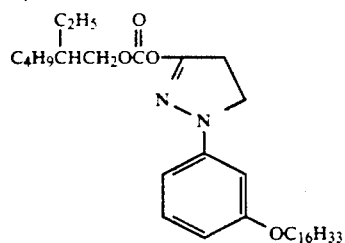
Cpd-11
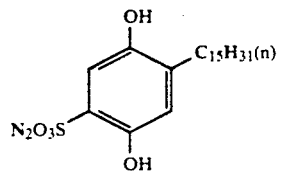
Cpd-12

-continued
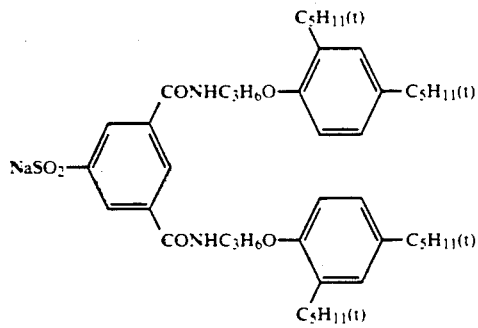
Cpd-13
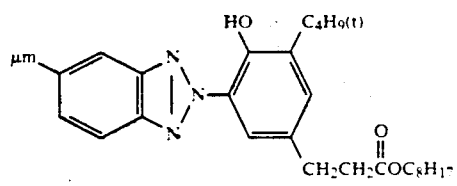
Cpd-14
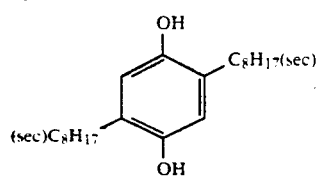
Cpd-15
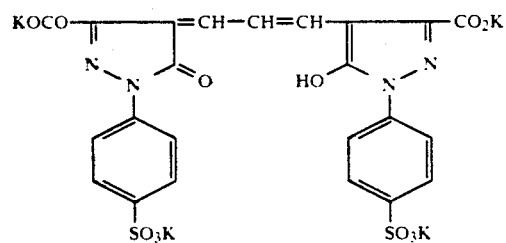
Cpd-16
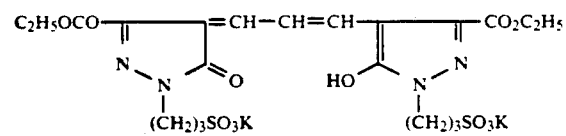
Cpd-17
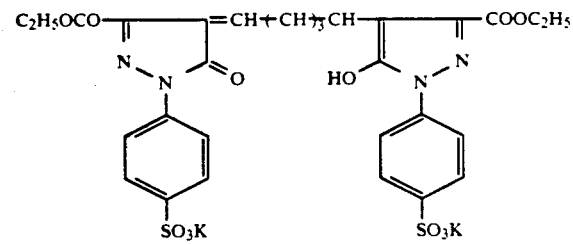
Cpd-18

-continued
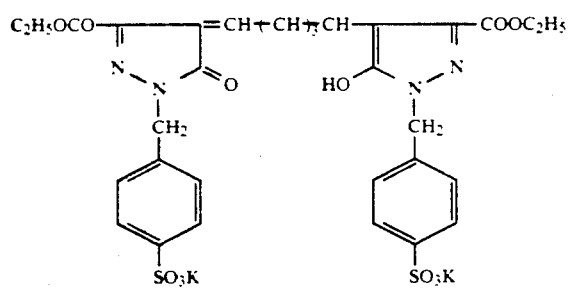
Cpd-19
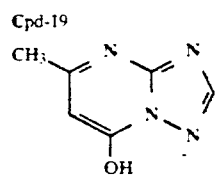
Cpd-20
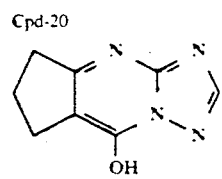
Cpd-21
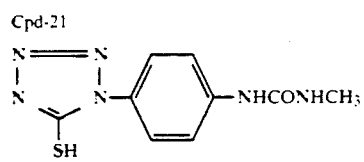
Cpd-22
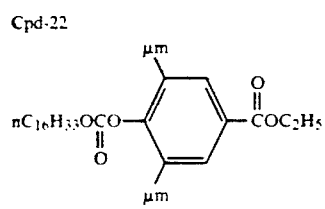
Cpd-23
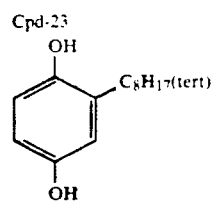
Cpd-24
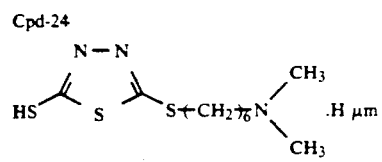
ExC-1
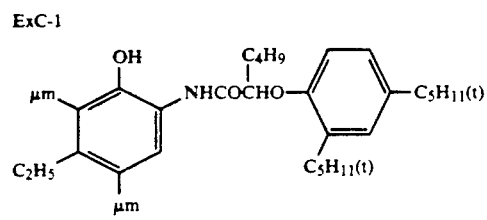
ExC-2

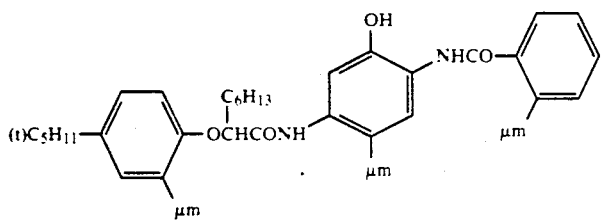

ExM-1

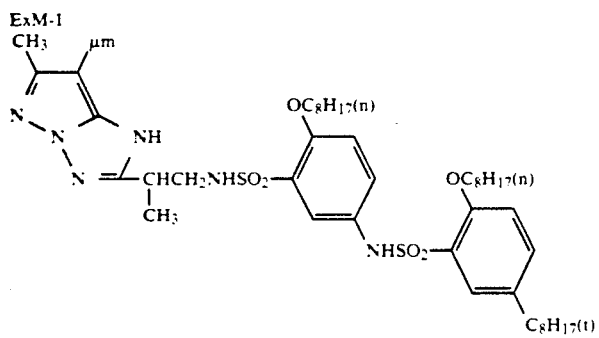

ExM-2

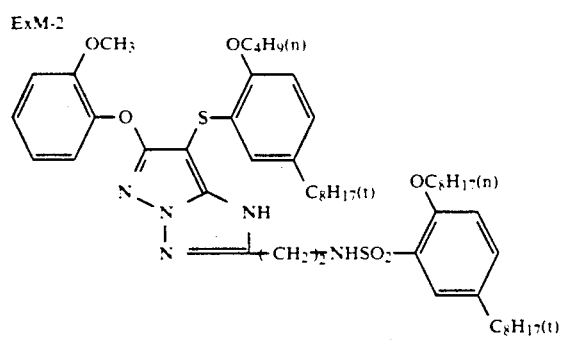

ExY-1

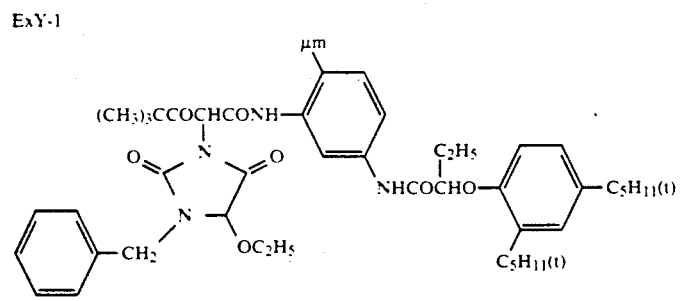

Solv-1 Di-(2-ethylhexyl) phthalate
Solv-2 Trinonyl phosphate
Solv-3 Di-(3-methylhexyl) phthalate
Solv-4 Tricresyl phosphate
Solv-5 Dibutyl phthalate
Solv-6 Trioctyl phosphate
Solv-7 Di-(2-ethylhexyl) sebacate
H-1 1,2-bis(vinylsulfonylacetamido) ethane
EXZK-1 7-[3-(5-mercaptotetrazol-1-yl)benzamido]-10-propargyl-1,2,3,4-tetrahydroacridinium perchlorate A process for forming visible images on the above-mentioned color photographic materials is now given.

| Process | Time | Temperature | Replenishment Amount |
|---|---|---|---|
| Color development | 1 min. 30 sec. | 38° C. | 300 ml/m² |
| Bleach fixing | 40 sec. | 35° C. | 300 ml/m² |
| Wash (1) | 40 sec. | 30-36° C. | |
| Wash (2) | 40 sec. | 30-36° C. | |
| Wash (3) | 15 sec. | | 320 ml/m² |
| Drying | 30 sec. | 75-80° C. | |

The so-called counterflow replenishment method, in which the supply is made to the washing bath (3) and the overflow from the washing bath (3) is led into the washing bath (2) and the overflow from the washing bath (2) into the washing bath (1), was used as the replenishment method for the washing water. Since the carry-over from the photosensitive material prebath was 35 ml/m² the replenishment magnification was 9.1.

| Color Developing Solution | Main Solution |
|---|---|
| Ethylenediaminetetrakismethylenephosphonic acid | 0.5 g |
| Diethylene glycol | 8.0 g |
| Benzyl alcohol | 12.0 g |
| Sodium bromide | 0.6 g |
| Sodium chloride | 0.5 g |
| Sodium sulfite | 2.0 g |
| N,N-Diethylhydroxylamine | 3.5 g |
| Triethylenediamine (1,4-diazabicyclo[2.2.2]octane) | 3.5 g |
| 3-Methyl-4-amino-N-ethyl-N-(β-methanesulfonamidoethyl)-anilinesulfate | 5.5 g |
| Potassium carbonate | 30.0 g |
| Fluorescent whitener (stilbene-based) | 1.0 g |
| Pure water | to 1,000 ml |
| pH | 10.50 |

The pH was adjusted with potassium hydroxide or hydrochloric acid.

| Bleach-fixing Solution | Parent Solution |
|---|---|
| Ammonium thiosulfate | 100 g |
| Sodium hydrogen sulfite | 21.0 g |
| Ethylenediaminetetraacetic acid iron (III) ammonium salt dihydrate | 50.0 g |
| Ethylenediaminetetraacetic acid disodium salt dihydrate | 5.0 g |
| Pure water | to 1,000 ml |
| pH | 6.3 |

The pH was adjusted with aqueous ammonia or hydrochloric acid.

Pure water was used (parent solution=replenishment solution).

Pure water as referred to here denotes mains water which the concentration of all the cations apart from hydrogen ions and all the anions apart from oxygen ions have been removed to 1 ppm or less by means of an ion exchange treatment.

As mentioned above, it is possible to provide a layer sensitive to any desired light in the photosensitive materials of this invention by matching with the light source of the exposing device. it is also possible to obtain a good image by combination of a red-sensitive layer and 2 types of infrared-sensitive layers.

It is possible to use, for example, a combination of the substance shown below as the sensitizing dyes used in the infrared-sensitive layers.

1. Sensitizing dyes having sensitivities close to 750 nm.

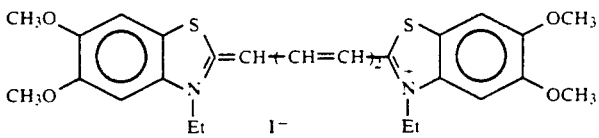

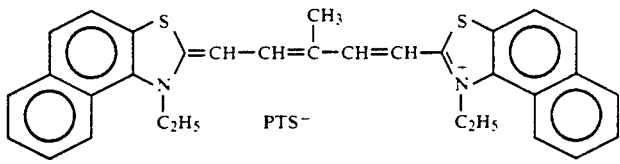

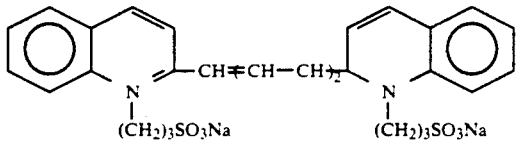

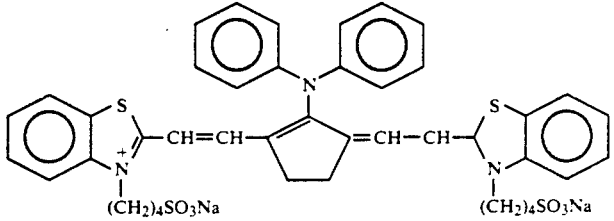

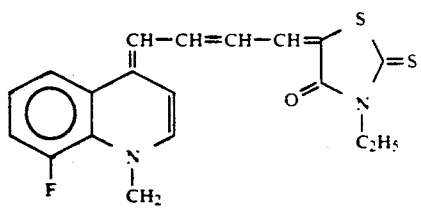

2. Sensitizing dyes having sensitivities close to 810 nm.

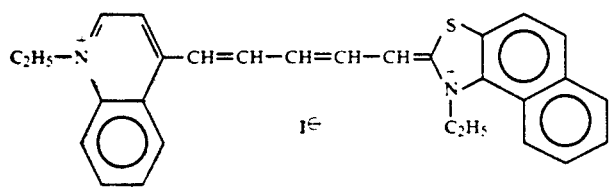

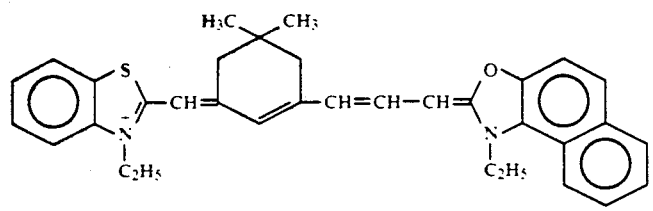

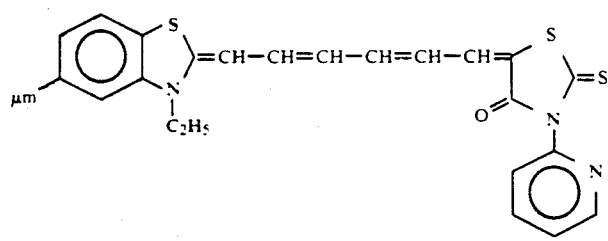

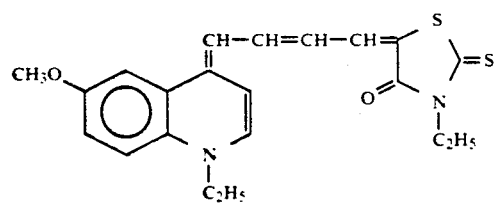

3. Sensitizing dyes having sensitivities close to 850 nm.

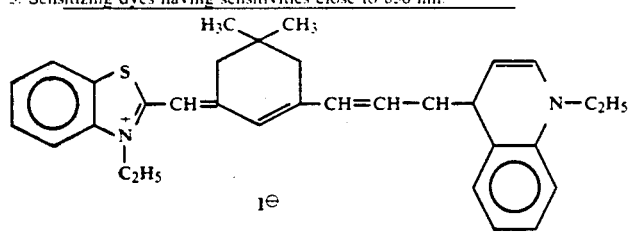

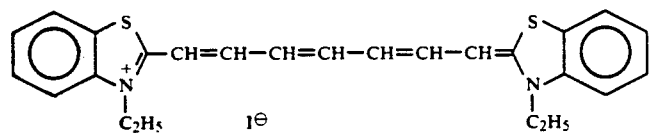

It is possible to use the following combinations as trichromatic exposure light sources which can be used with the thermodeveloping photosensitive elements of the examples mentioned above.

(Illustration 1) For thermodeveloping elements having spectral sensitivities in the red to infrared region:
1. AlGaInP semiconductor later
   (emission excitation wavelength ca. 670 nm)
   GaAlAs semiconductor laser (emission excitation wavelength ca. 750 nm)
GaAlAs semiconductor laser
(emission excitation wavelength ca. 810 nm)
2. AlGaInP semiconductor later
(emission excitation wavelength ca. 670 nm)
GaAlAs semiconductor laser
(emission excitation wavelength ca. 780 nm)
GaAlAs semiconductor laser
(emission excitation wavelength ca. 830 nm)
3. GaAlAs semiconductor later
(emission excitation wavelength ca. 750 nm)
GaAlAs semiconductor laser
(emission excitation wavelength ca. 810 nm)
GaAs semiconductor laser
(emission excitation wavelength ca. 900 nm)
(Illustration 2) For thermodeveloping elements having spectral sensitivities in the blue to red region:
1. GaAlAs semiconductor later
(emission excitation wavelength ca. 810 nm) +SHG member
AlGaInP semiconductor laser
(emission excitation wavelength ca. 670 nm)
GaAlAs semiconductor laser
(emission excitation wavelength ca. 810 nm)
2. YAG:Nd$^{3+}$ semiconductor later
(emission excitation wavelength ca. 1,060 nm) +SHG member
AlGaInP semiconductor laser
(emission excitation wavelength ca. 670 nm)
GaAlAs semiconductor laser
(emission excitation wavelength ca. 810 nm)
3. GaP light-emitting diode
(emission excitation wavelength ca. 570 nm)
AlGaInP semiconductor laser
(emission excitation wavelength ca. 670 nm)
GaAlAs semiconductor laser
(emission excitation wavelength ca. 780 nm)
(Illustration 3) For thermodeveloping photosensitive element having a spectral sensitivity in the visible light region:
1. GaAs semiconductor later
(emission excitation wavelength ca. 900 nm) +SHG member
InGaAs semiconductor laser
(emission excitation wavelength ca. 1,100 nm) +SHG member
AlGaInP semiconductor laser
(emission excitation wavelength ca. 680 nm)
2. GaAlAs semiconductor later
(emission excitation wavelength ca. 850 nm) +SHG member
YAG:Nd$^{3+}$ semiconductor laser
(emission excitation wavelength ca. 1,060 nm) +SHG member
InGaAsP semiconductor laser
(emission excitation wavelength ca. 1,300 nm) +SHG member

What is claimed is:

1. A copying machine comprising;
an image reading device for photoelectrically scanning an original to obtain a trichromatic separated signal;
an image processing device for reading and processing the trichromatic separated signal and providing an output signal accordingly;
an exposure device for trichromatically exposing thermodevelopment and color-sensitive materials in accordance with the output signal from said image processing device; and
a thermodevelopment and transfer device for thermally developing the exposed color-sensitive materials and thermally transferring an image represented by said trichromatic separated signal to an image-receiving material in a single stage.

2. A copying machine as claimed in claim 1, wherein said image reading device comprises:
an illuminating lamp for scanning said original and providing light output accordingly;
a plurality of mirrors for receiving and reflecting said light output;
a color separation filter for receiving the reflected light output and dividing it into a three-color output in time division fashion; and
a line sensor for photoelectrically converting said three-color output into three-color image signals.

3. A copying machine as claimed in claim 1, wherein said image processing device comprises:
an analog-to-digital conversion circuit for receiving said three-color image signals as an analog signal and producing a digital signal accordingly;
a border emphasizer circuit for correcting a spatial frequency response of said digital signal and outputting a corrected digital signal accordingly;
a color correction circuit for determining an amount of exposure of said corrected digital signal and outputting a corrected color signal accordingly; and
an exposure control circuit for controlling a color exposure of said corrected color signal.

4. A copying machine as claimed in claim 3, wherein said image processing device further comprises a sensor, disposed in said thermodevelopment and transfer device, for detecting a hue, saturation, and lightness of a said image and providing a feedback signal to said color correction circuit accordingly.

5. A copying machine comprising:
an image reading device for photoelectrically scanning an original to obtain a trichromatic separated signal;
an image processing device for reading and processing the trichromatic separated signal and providing an output signal accordingly;
an exposure device for trichromatically exposing thermodevelopment and color-sensitive materials in accordance with the output signal from said image processing device; and
a thermodevelopment and transfer device for thermally developing the exposed color-sensitive materials and thermally transferring an image to an image-receiving materials;
wherein said image processing device comprises:
an analog-to-digital conversion circuit for receiving said three-color image signals as an analog signal and producing a digital signal accordingly;
a border emphasizer circuit for correcting a spatial frequency response of said digital signal and outputting a corrected digital signal accordingly;
a color correction circuit for determining an amount of exposure of said corrected digital signal and outputting a corrected color signal accordingly; and
an exposure control circuit for controlling a color exposure of said corrected color signal;
wherein said image processing device further comprises a sensor, disposed in said thermodevelopment and transfer device, for detecting a hue, saturation, and lightness of said image and providing a feedback signal to said color correction circuit accordingly; and wherein said sensor comprises a lamp for illuminating said image and providing light output accordingly;

a color separation filter for dividing said light output into separate color signals;

a photoelectric conversion element for photoelectrically converting said separate color signals into photo-analog signals; and an operational circuit for converting said photo-analog signals into digital signals.

6. A copying machine as claimed in claim 5, wherein said operational circuit comprises:

means for performing current-to-voltage conversion on said photo-analog signal and outputting voltage signals accordingly;

means for sampling and holding said voltage signals; and analog-to-digital conversion means for converting said voltage signals to said digital signals.

7. A copying machine as claimed in claim 1, wherein said exposure device comprises:

first, second, and third semiconductor lasers for emitting respective first, second, and third laser beams of three different wavelengths;

first, second, and third secondary harmonic generators, respectively receiving said first, second, and third laser beams, for halving the wavelengths of the laser beams and outputting first, second, and third altered later beams;

a first mirror for reflecting said first altered laser beam along a optical path;

a second mirror, comprising a dichroic mirror, for reflecting said second altered laser beam along said optical path while transmitting said first altered laser a third mirror, also comprising a dichroic mirror, for reflecting said third altered laser beam along said optical path while transmitting said first and second altered laser beams; and means for reflecting and focusing said first, second, and third altered laser beams onto said color-sensitive materials.

8. A copying machine as claimed in claim 1, wherein said thermodevelopment and transfer device comprises a plurality of pairs of heating rollers, a plurality of heating guide plates disposed between adjacent ones of said pairs of heating rollers, and a plurality of heaters disposed along an axial direction of each of said heating rollers, wherein said image receiving materials having said image thermally transferred thereto during passage between said pairs of heating rollers.

9. A copying machine as claimed in claim 1, herein said thermodevelopment and transfer device comprises a heating drum having a heating unit disposed therein, and an endless belt which contacts said heating drum, wherein said image receiving materials have said image thermally transferred thereto during passage between heating drum and said endless belt.

10. A copying machine comprising:

an image reading device for photoelectrically scanning an original to obtain a three-color separated signal;

an image processing device for processing the three-color separated signal and providing an output signal accordingly;

an exposure device for exposing a color photosensitive material in terms of three colors in accordance with the output signal from the image processing device; and a developing device for forming a visible image represented by said three-color separated signal on the color exposed photosensitive material in a single stage.

11. A copying machine as claimed in claim 10, wherein said image reading device comprises:

an illuminating lamp for scanning said original and providing light output accordingly;

a plurality of mirrors for receiving and reflecting said light output;

a color separation filter for receiving the reflected light output and dividing it into a three-color output in time division fashion; and a line sensor for photoelectrically converting said three-color output into three-color image signals.

12. A copying machine as claimed in claim 10, wherein said image processing device comprises:

an analog-to-digital conversion circuit for receiving said three-color image signals as an analog signal and producing a digital signal accordingly;

a border emphasizer circuit for correcting a spatial frequency response of said digital signal and outputting a corrected digital signal accordingly;

a color correction circuit for determining an amount of exposure of said corrected digital signal and outputting a corrected color signal accordingly; and an exposure control circuit for controlling a color exposure of said corrected color signal.

13. A copying machine as claimed in claim 12, wherein said image processing device further comprises a sensor, disposed in said developing device, for detecting a hue, saturation, and lightness of a said image and providing a feedback signal to said color correction circuit accordingly.

14. A copying machine comprising:

an image reading device for photoelectrically scanning an original to obtain a three-color separated signal;

an image processing device for processing the three-color separated signal and providing an output signal accordingly;

an exposure device for exposing a color photosensitive material in terms of three colors in accordance with the output signal from the image processing device; and a developing device for forming a visible image on the color-exposed photosensitive material;

wherein said image processing device comprises:

an analog-to-digital conversion circuit for receiving said three-color image signal as an analog signal and producing a digital signal accordingly;

a border emphasizer circuit for correcting a spatial frequency response of said digital signal and outputting a corrected digital signal accordingly;

a color correction circuit for determining an amount of exposure of said corrected digital signal and outputting a corrected color signal accordingly; and an exposure control circuit for controlling a color exposure of said corrected color signal;

wherein said image processing device further comprises a sensor, disposed in said developing device, for detecting a hue, saturation, and lightness of a said image and providing a feedback signal to said color correction circuit accordingly; and wherein said sensor comprises a lamp for illuminating said image and providing light output accordingly;

a color separation filter for dividing said light output into separate color signals;

a photoelectric conversion element for photoelectrically converting said separate color signals into photo-analog signals; and an operational circuit for converting said photo-analog signals into digital signals.

15. A copying machine as claimed in claim 14, wherein said operational circuit comprises:

means for performing current-to-voltage conversion on said photo-analog signals and outputting voltage signals accordingly;

means for sampling and holding said voltage signals; and analog-to-digital conversion means for converting said voltage signals to said digital signals.

16. A copying machine as claimed in claim 10, wherein said exposure device comprises;

first, second, and third semiconductor lasers for emitting respective first, second, and third laser beams of three different wavelengths;

a first mirror for reflecting said first laser beam along an optical path;

a second mirror, comprising a dichroic mirror, for reflecting said second laser beam along said optical path while transmitting said first laser beam;

a third mirror, also comprising a dichroic mirror, for reflecting said third laser beam along said optical path while transmitting said first and second laser beams; and means for reflecting and focusing said first, second, and third laser beams onto said color photosensitive material.

17. A copying machine comprising:

an image reading device for photoelectrically scanning an original to obtain a three-color separated signal;

an image processing device for processing the three-color separated signal and providing an output signal accordingly;

an exposure device for exposing a color photosensitive material in terms of three colors in accordance with the output signal from the image processing device;

a developing device for forming a visible image on the color-exposed photosensitive material;

means for feeding said color photosensitive materials into said developing device, said feeding means comprising means for passing said color photosensitive material past said exposure device so as to expose said color photosensitive material; and first hinge means for pivotably attaching said feeding means to said developing device.

18. A copying machine as claimed in claim 17, further comprising;

an exposure unit frame for housing said image reading device, said image processing device, and said exposure device; and second hinge means for pivotably attaching said exposure unit frame to said developing device.

* * * * *